(12) United States Patent
Nakamura et al.

(10) Patent No.: US 9,604,646 B2
(45) Date of Patent: Mar. 28, 2017

(54) CONTROL DEVICE FOR VEHICLE

(71) Applicant: HONDA MOTOR CO., LTD., Tokyo (JP)

(72) Inventors: Masanori Nakamura, Wako (JP); Dai Arai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/068,778

(22) Filed: Mar. 14, 2016

(65) Prior Publication Data
US 2016/0280228 A1 Sep. 29, 2016

(30) Foreign Application Priority Data

Mar. 26, 2015 (JP) .................. 2015-065046

(51) Int. Cl.
| | |
|---|---|
| B60W 40/076 | (2012.01) |
| B60W 30/19 | (2012.01) |
| B60T 1/06 | (2006.01) |
| B60T 13/66 | (2006.01) |

(52) U.S. Cl.
CPC ............ *B60W 30/19* (2013.01); *B60T 1/062* (2013.01); *B60T 13/662* (2013.01); *B60W 40/076* (2013.01); *B60T 2201/04* (2013.01); *B60T 2260/04* (2013.01)

(58) Field of Classification Search
None
See application file for complete search history.

(56) References Cited

U.S. PATENT DOCUMENTS

| 2011/0010065 A1* | 1/2011 | Bach ............... B60K 31/04 |
| | | 701/70 |
| 2013/0332042 A1* | 12/2013 | Beever ............. B60T 7/122 |
| | | 701/70 |

FOREIGN PATENT DOCUMENTS

JP 2010-151154 A 7/2010

\* cited by examiner

*Primary Examiner* — Justin Holmes
(74) *Attorney, Agent, or Firm* — Squire Patton Boggs (US) LLP

(57) ABSTRACT

A control device of a vehicle has a hill ascent angle update determiner, a slope estimator, a deceleration determiner, and a hill ascent angle estimator. The deceleration determiner determines that a vehicle is in a deceleration state when the throttle opening is equal to or lower than a threshold. The hill ascent angle update determiner prohibits update processing of an estimated hill ascent angle in the increase direction by the hill ascent angle estimator if the slope estimator estimates that a road surface has an upward slope and the deceleration determiner determines that the vehicle is in the deceleration state.

10 Claims, 13 Drawing Sheets

CONTROL DEVICE FOR VEHICLE

BACKGROUND

Field

The present invention relates to a control device of a vehicle that estimates the slope of a road surface on which the vehicle travels on the basis of the vehicle speed, the rotation speed of a drive source, an acceleration operation amount, and so forth and controls an automatic transmission on the basis of the estimated slope.

Description of the Related Art

In Patent Document 1 (Japanese Patent Laid-Open No. 2010-151154), the following technique is disclosed. The slope of a road surface on which a vehicle travels is estimated on the basis of the vehicle speed, the engine rotation speed, an acceleration operation amount to the vehicle, and so forth. In the brake-on state (when a brake is operated), it is determined that the vehicle is traveling on a downhill, and hill descent control is carried out.

According to Patent Document 1, in the case of the brake-off state (when a brake is not being operated), the hill descent control is not carried out because the driver is not intending to decelerate the vehicle.

However, when the driver operates a brake detector such as a brake switch, a brake lever, or a brake pedal to carry out brake operation with the intention to decelerate the vehicle, if this brake detector is in failure, an ECU determines that the driver does not have the intention to decelerate the vehicle because a brake-on signal is not input from the brake detector. As a result, the ECU does not carry out the hill descent control even when the vehicle is traveling on a downhill.

Specifically, in the case in which power of an engine as a drive source is transmitted to a drive wheel via an automatic transmission, when the vehicle speed decelerates, the ECU determines whether the deceleration is caused by brake operation by the driver or by traveling of the vehicle on a flat road or an uphill. However, as described above, if the brake detector is in failure, even when the driver carries out brake operation with the intention to decelerate the vehicle while the vehicle is traveling on a downhill, the brake-on signal is not input from the brake detector to the ECU and thus there is a possibility that the ECU erroneously determines that the vehicle is traveling on a flat road or an uphill.

It will also be possible to equip the vehicle with an angle sensor or an inclination sensor and sense an uphill, a flat road, or a downhill in order to prevent the erroneous determination. However, providing the angle sensor or the inclination sensor requires high cost. To prevent the erroneous determination without high cost, a method of estimating an uphill, a flat road, or a downhill by using detection results of various kinds of detecting units with which the vehicle is equipped needs to be established.

SUMMARY

Therefore, the present invention intends to provide a control device of a vehicle that prevents erroneous determination of an ECU when a brake detector is in failure and enables control of an automatic transmission in conformity with the intention of a driver.

A control device of a vehicle according to embodiments of the present invention has a vehicle speed detector, a rotation speed detector, an acceleration operation amount detector, a slope estimator, a hill ascent angle estimator, a brake detector, and a shift controller.

The vehicle speed detector detects the vehicle speed of the vehicle that transmits power of a drive source to a drive wheel via an automatic transmission. The rotation speed detector detects the rotation speed of the drive source. The acceleration operation amount detector detects an acceleration operation amount to the vehicle. The slope estimator estimates the slope of a road surface on which the vehicle travels on the basis of the vehicle speed, the rotation speed, the acceleration operation amount, and the transmission gear ratio of the automatic transmission. The hill ascent angle estimator estimates a hill ascent angle on the basis of the slope. The brake detector detects whether operation to a brake of the vehicle is present or absent. The shift controller controls the automatic transmission on the basis of the hill ascent angle estimated by the hill ascent angle estimator and operation of the brake detected by the brake detector.

A first characteristic of embodiments of the invention is that the control device further has a deceleration determiner that determines that the vehicle is in a deceleration state when the acceleration operation amount is equal to or smaller than a threshold. A hill ascent angle update determiner that prohibits update processing of the hill ascent angle in the increase direction by the hill ascent angle estimator, if the slope estimator estimates that the road surface has an upward slope and the deceleration determiner determines that the vehicle is in the deceleration state.

A second characteristic is that the threshold increases in association with a rise in the vehicle speed.

A third characteristic is that the shift controller carries out hill ascent control to change the transmission gear ratio by using a hill ascent shift map that hastens execution of a shift-down of the automatic transmission compared with in flat road traveling on the basis of the hill ascent angle, when the slope estimator determines that the road surface has the upward slope due to acceleration of the vehicle according to the acceleration operation amount. Then, the vehicle further accelerates.

A fourth characteristic is that the shift controller carries out hill descent control to change the transmission gear ratio by using a hill descent shift map that hastens execution of a shift-down of the automatic transmission compared with in flat road traveling on the basis of the hill ascent angle when the slope estimator determines that the road surface has a downward slope after operation of the brake is carried out, and then operation of the brake is carried out a predetermined number of times.

A fifth characteristic is that the shift controller counts the number of times of operation of the brake. The shift controller resets count of the number of times of operation if the hill ascent angle is equal to or larger than a certain value and the acceleration operation amount is given to the vehicle. Cruise traveling of the vehicle continues for a predetermined time before operation of the brake is carried out the predetermined number of times.

According to the first characteristic of the present invention, the acceleration operation amount is not given to the vehicle when the driver is operating the brake. Therefore, when the acceleration operation amount is equal to or lower than the threshold, the deceleration determiner determines that the driver does not want acceleration of the vehicle and this vehicle is in the deceleration state. As a result, if the slope estimator estimates that the road surface has an upward slope and the deceleration determiner determines that the vehicle is in the deceleration state, the hill ascent angle update determiner prohibits the update processing of the hill ascent angle in the increase direction by the hill ascent angle estimator. The occurrence of acceleration that is not intended by the driver can be thereby prevented even if the brake detector is in failure. As above, in the first characteristic, erroneous determination in an ECU when the brake detector is in failure can be prevented and thus control of the automatic transmission in conformity with the intention of the driver is enabled.

In embodiments of the present invention, the "vehicle" is a concept including various kinds of vehicles such as two-wheeled vehicles, four-wheeled vehicles, hybrid vehicles, and electric vehicles. Furthermore, the "drive source" is a concept including an engine, a motor, and so forth of the vehicle. Moreover, the "acceleration operation amount" refers to the instruction amount of acceleration from the driver to the vehicle and is a concept including the operation amount of a throttle grip, the amount of pressing of an accelerator pedal, the throttle opening, and so forth. In addition, the "acceleration operation amount detector" is means that detects the acceleration operation amount and is a concept including a throttle grip opening sensor, an accelerator pedal sensor, a throttle opening sensor, and so forth. Furthermore, the "hill ascent angle" is a concept including the inclination angle of the road surface according to a slope of the upward direction (hill ascent direction) (inclination angle of an uphill) and the inclination angle of the road surface according to a slope of the downward direction (hill descent direction) (inclination angle of a downhill). Moreover, the "brake detector" is a concept including a brake switch, a brake lever, a brake pedal, and so forth with which the driver carries out brake operation.

According to the second characteristic of the present invention, the threshold is increased in association with a rise in the vehicle speed. In high-speed traveling, the running resistance against the vehicle becomes higher and thus the driver gives a larger acceleration operation amount to the vehicle. Therefore, by increasing the threshold also in view of the amount of rise in the vehicle speed according to the increase in the acceleration operation amount, the automatic transmission can be properly controlled according to the change in the vehicle speed.

According to the third characteristic of the present invention, the hill ascent control by use of the hill ascent shift map is carried out if the vehicle further accelerates after the vehicle accelerates according to the acceleration operation amount and the slope estimator determines that the road surface has an upward slope. Thus, the transmission gear ratio of the automatic transmission can be changed to a proper one according to acceleration operation by the driver.

According to the fourth characteristic of the present invention, the hill descent control by use of the hill descent shift map is carried out after the slope estimator determines that the road surface has a downward slope and brake operation by the driver is carried out plural times. Thus, the transmission gear ratio of the automatic transmission can be changed to a proper one according to acceleration operation by the driver.

According to the fifth characteristic of the present invention, the shift controller counts the number of times of operation of the brake by the driver, and the shift controller resets the count of the number of times of operation under a condition in which the hill ascent angle is equal to or larger than the certain value and the acceleration operation amount is given to the vehicle and the cruise traveling of the vehicle continues for the predetermined time. Due to this, the shift controller does not make transition to the hill descent control if the downward slope (downhill) is not continuous. Thus, the automatic transmission can be properly controlled according to the slope of the road surface on which the vehicle travels.

DETAILED DESCRIPTION

Figure 1:
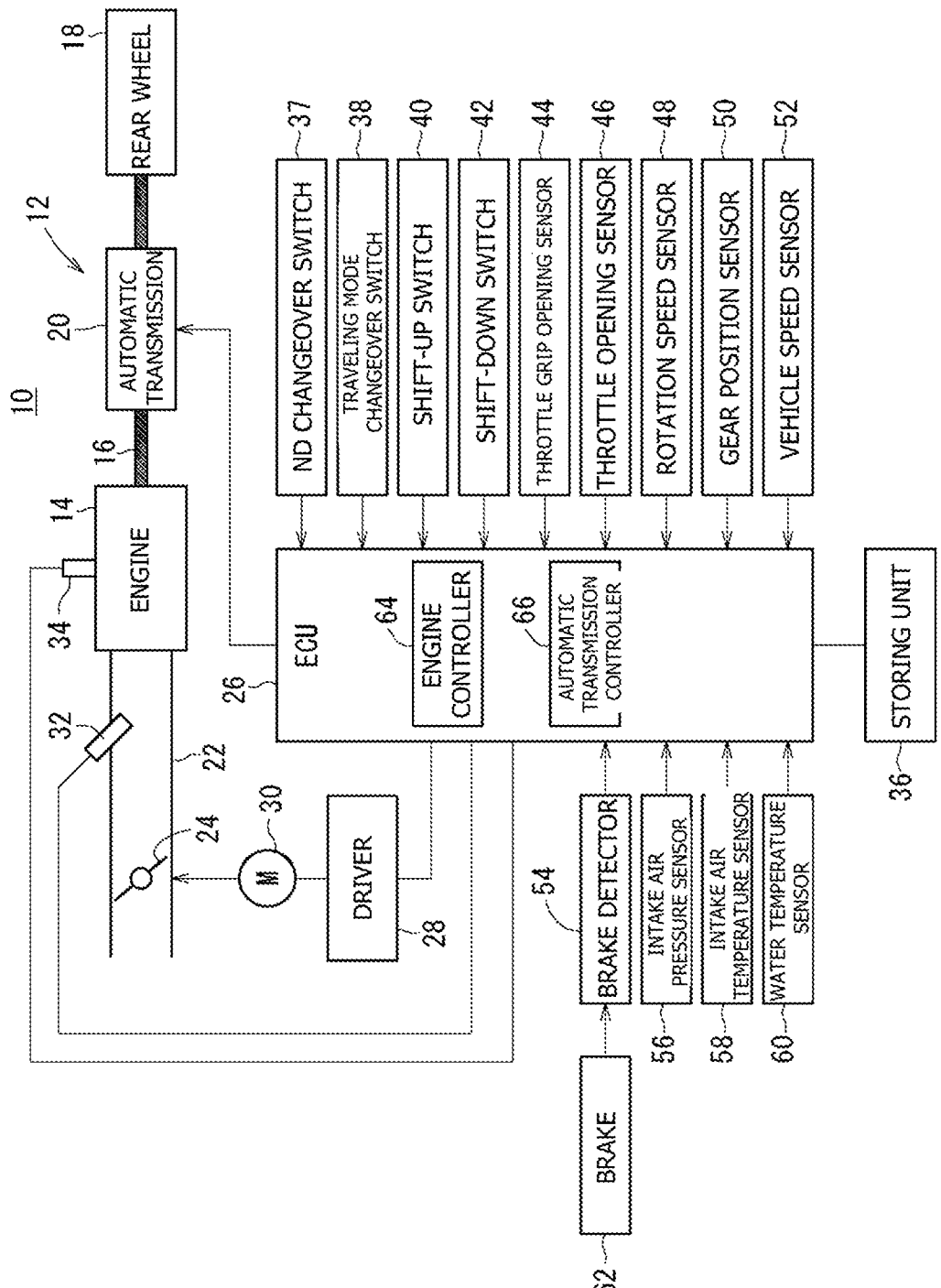
FIG. 1 is a configuration diagram of a control device according to an embodiment.

As shown in FIG. 1, a control device 10 of a vehicle according to the present embodiment (hereinafter, referred to also as the control device 10) is applied to various kinds of vehicles 12 such as two-wheeled vehicles, four-wheeled vehicles, hybrid vehicles, and electric vehicles. In the following description, a case in which the vehicle 12 is a motorcycle will be described unless particularly noted.

The vehicle 12 has an engine 14 as a drive source and an automatic transmission 20 that is joined to a crankshaft 16 as the output shaft of this engine 14 and transmits power of the engine 14 to a rear wheel 18 as a drive wheel.

An intake pipe 22 is joined to the engine 14 and a throttle valve 24 is provided in the intake pipe 22. An ECU 26 of the vehicle 12 controls a driver 28 and this driver 28 drives a motor 30. The degree of opening of the throttle valve 24 (throttle opening) is thereby adjusted. This adjusts the amount of intake air taken in to the engine 14 through the intake pipe 22.

An injector 32 is provided on the downstream side of the throttle valve 24 in the intake pipe 22. The injector 32 injects a fuel to air flowing into a combustion chamber of the engine 14 through the throttle valve 24 to generate an air-fuel mixture in accordance with control from the ECU 26.

The engine 14 is provided with an ignition plug 34. The ignition plug 34 carries out ignition in accordance with control from the ECU 26 to burn the air-fuel mixture that has flowed from the intake pipe 22 into the combustion chamber. The engine 14 thereby transforms the combustion energy to power.

The automatic transmission 20 has plural shift gear stages and automatically switches the shift gear stage according to the vehicle speed and the throttle opening in accordance with control from the ECU 26. The automatic transmission 20 thereby transmits a rotational force that is the power transmitted from the crankshaft 16 of the engine 14 to the rear wheel 18 with variation in the transmission gear ratio.

The control device 10 according to the present embodiment has the ECU 26, a storing unit 36, and detecting units such as various kinds of sensors and switches provided in the vehicle 12.

Specifically, the vehicle 12 is provided with an ND changeover switch 37, a traveling mode changeover switch 38, a shift-up switch 40, a shift-down switch 42, a throttle grip opening sensor (acceleration operation amount detector) 44, a throttle opening sensor (acceleration operation amount detector) 46, a rotation speed sensor (rotation speed detector) 48, a gear position sensor 50, a vehicle speed sensor (vehicle speed detector) 52, a brake detector 54, an intake air pressure sensor 56, an intake air temperature sensor 58, and a water temperature sensor 60.

The ND changeover switch 37 is a switch with which, when the vehicle 12 is stopped, a driver 61 (see FIG. 7) switches the state of the automatic transmission 20 to a neutral state (N) or a drive range state (D) by pressing a switch on the neutral (N) side or the drive range (D) side. The traveling mode changeover switch 38 is a switch for switching the traveling mode to an automatic shift mode in which the shift gear stage of the automatic transmission 20 is automatically switched or a manual shift mode in which the shift gear stage is manually switched by switch operation by the driver 61.

The shift-up switch 40 is a switch for manually carrying out a shift-up of the automatic transmission 20 in the automatic shift mode. The shift-down switch 42 is a switch for manually carrying out a shift-down of the automatic transmission 20 in the automatic shift mode. In this case, when the driver 61 operates one of the shift-up switch 40 and the shift-down switch 42 in the automatic shift mode, the traveling mode is switched from the automatic shift mode to the manual shift mode.

The ND changeover switch 37, the traveling mode changeover switch 38, the shift-up switch 40, and the shift-down switch 42 output an operation signal indicating an operation result by the driver 61 to the ECU 26 every constant cycle or every time the driver 61 carries out switch operation.

The throttle grip opening sensor 44 detects the degree of opening of a throttle grip (not shown) in the vehicle 12 (acceleration operation amount). The throttle opening sensor 46 detects the throttle opening of the throttle valve 24 (acceleration operation amount). The rotation speed sensor 48 detects the rotation speed of the crankshaft 16 of the engine 14 as the engine rotation speed. The gear position sensor 50 detects the gear position that is the present shift gear stage of the automatic transmission 20. The vehicle speed sensor 52 detects the vehicle speed of the vehicle 12 by detecting the rotation speed of the rear wheel 18. The intake air pressure sensor 56 is provided in the intake pipe 22 and detects the intake air pressure of air taken in to the engine 14. The intake air temperature sensor 58 is provided in the intake pipe 22 and detects the intake air temperature that is the temperature of air taken in to the engine 14. The water temperature sensor 60 detects the water temperature of cooling water that cools the engine 14. These sensors 44 to 52 and 56 to 60 detect the physical amount of the detection target at a constant cycle and output a signal indicating the detection result to the ECU 26.

The brake detector 54 is a brake switch, a brake lever, or a brake pedal for allowing the driver 61 to carry out brake operation. When a brake 62 is actuated due to brake operation by the driver 61, the brake detector 54 generates a brake-on signal indicating that brake operation is carried out. The brake detector 54 outputs, to the ECU 26, the brake-on signal or a brake-off signal indicating that brake operation is not being carried out every constant cycle.

The ECU 26 has an engine controller 64 that controls driving of the engine 14 and an automatic transmission controller 66 that controls driving of the automatic transmission 20. The storing unit 36 is a storage medium that stores various kinds of programs, data, and so forth. The ECU 26 reads and executes the programs stored in the storing unit 36 to implement functions of the engine controller 64 and the automatic transmission controller 66.

The engine controller 64 controls the engine rotation speed by adjusting the throttle opening according to the degree of opening of the throttle grip detected by the throttle grip opening sensor 44 and controlling the amount of fuel injection and the injection timing of the injector 32 and the ignition timing of the ignition plug 34 on the basis of the throttle opening or the degree of opening of the throttle grip, the vehicle speed detected by the vehicle speed sensor 52, and so forth.

The automatic transmission controller 66 controls driving of the automatic transmission 20 on the basis of plural gear shift maps stored in the storing unit 36.

Figure 2:
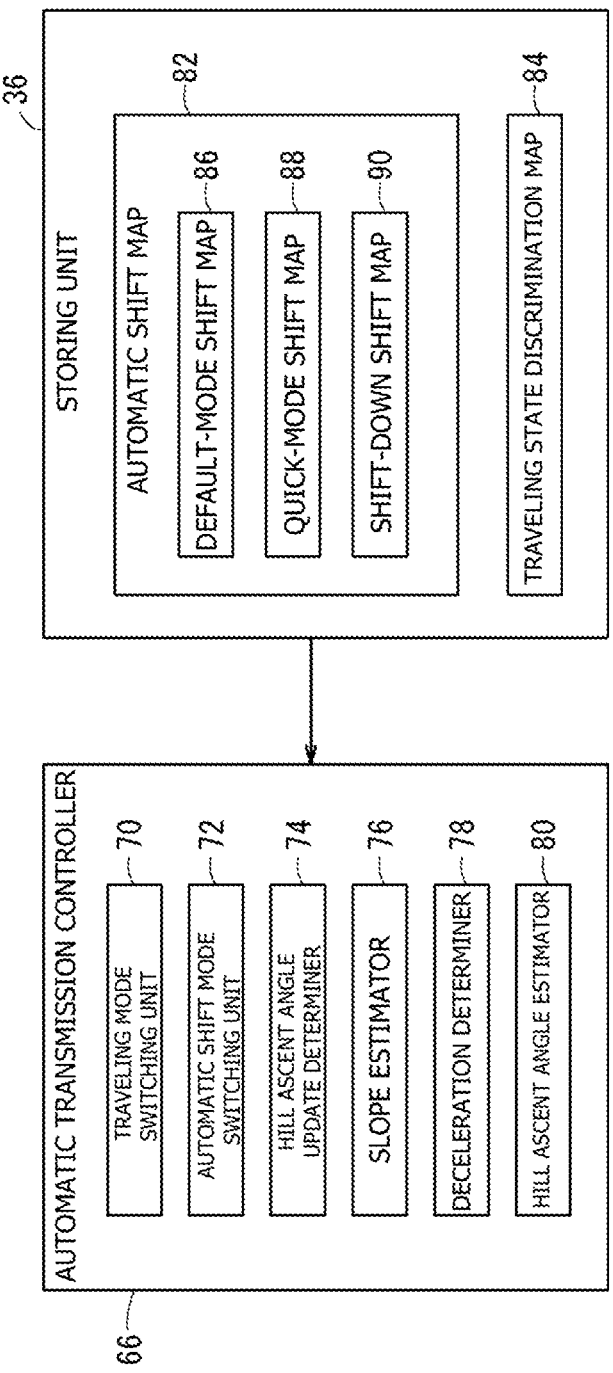
FIG. 2 is a functional block diagram of an automatic transmission controller and a storing unit in FIG. 1.

FIG. 2 is a functional block diagram of the automatic transmission controller 66 and the storing unit 36.

The automatic transmission controller 66 has a traveling mode switching unit 70, an automatic shift mode switching unit 72, a hill ascent angle update determiner 74, a slope estimator 76, a deceleration determiner 78, and a hill ascent angle estimator 80. The storing unit 36 has an automatic shift map 82 and a traveling state discrimination map 84. The automatic shift map 82 has a default-mode shift map 86, a quick-mode shift map (hill ascent shift map, hill descent shift map) 88, and a shift-down shift map 90. In the following description, the default-mode shift map 86 will be referred to as the D map 86 and the quick-mode shift map 88 will be referred to as the Q map 88.

Figure 3:
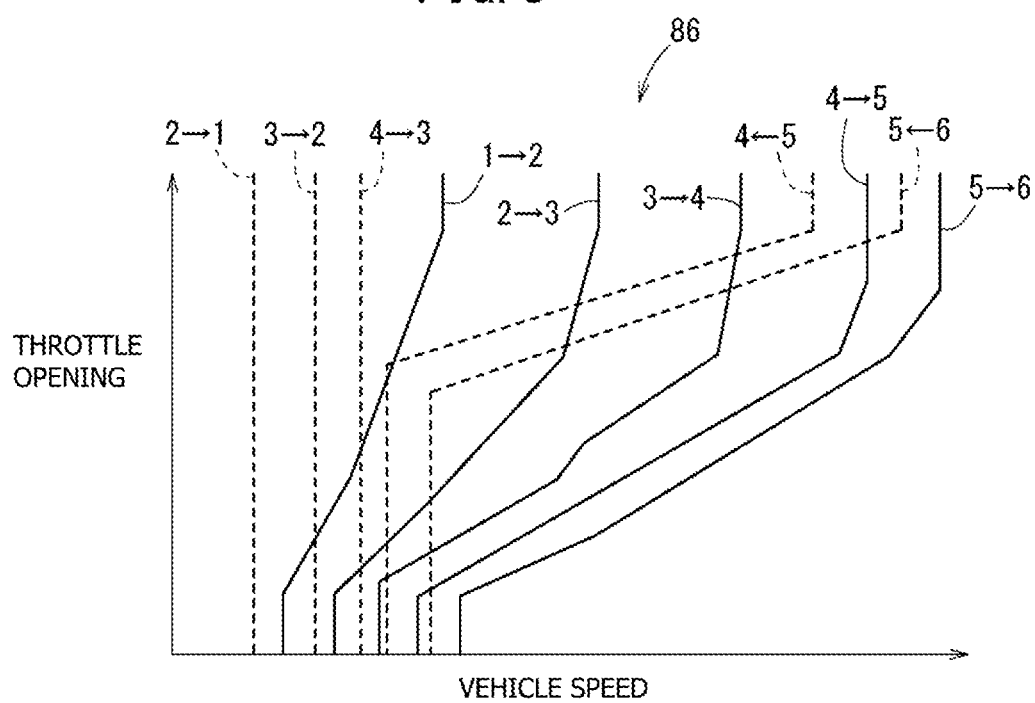
FIG. 3 is a diagram showing a D map.

FIG. 3 is a diagram showing the D map 86. In this map, gear shift timings of the automatic transmission 20 (see FIG. 1) according to the throttle opening and the vehicle speed are set. In FIG. 3, solid lines show shift timings at which the shift gear stage is switched to the higher speed side (first→second, second→third, third→fourth, fourth→fifth, and fifth→sixth). Dashed lines show shift timings at which the shift gear stage is switched to the lower speed side (sixth→fifth, fifth→fourth, fourth→third, third→second, and second→first).

Figure 4:
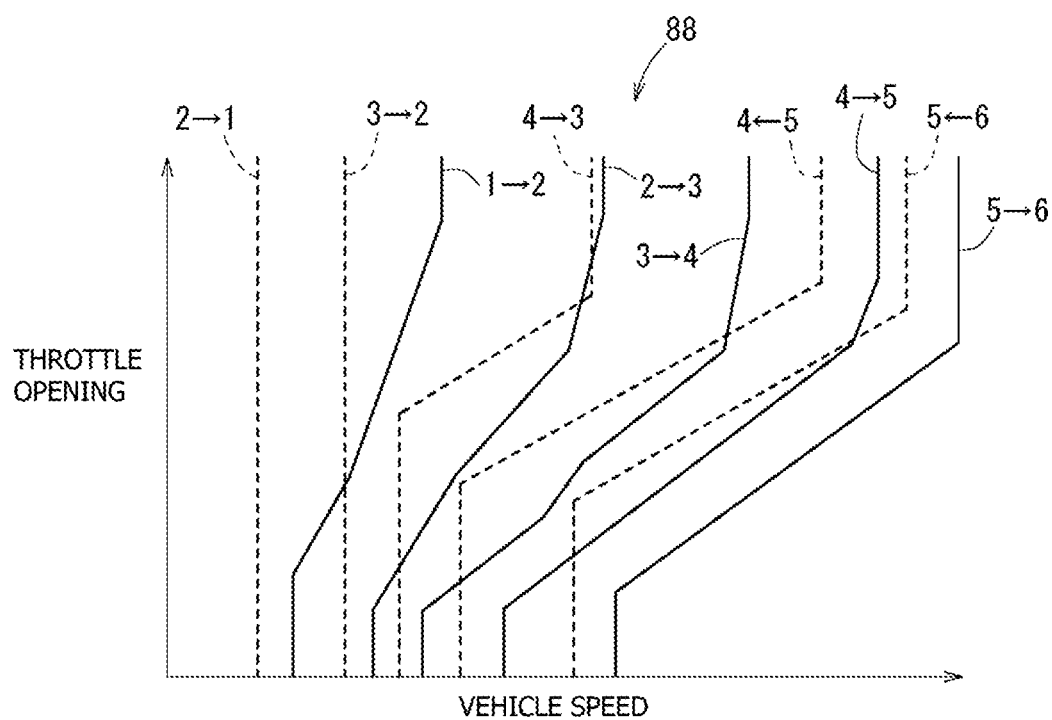
FIG. 4 is a diagram showing a Q map.

FIG. 4 is a diagram showing the Q map 88. In this map, gear shift timings of the automatic transmission 20 (see FIG. 1) according to the throttle opening and the vehicle speed are set similarly to the D map 86 (see FIG. 3). In FIG. 4, solid lines show shift timings at which the shift gear stage is switched to the higher speed side (first→second, second→third, third→fourth, fourth→fifth, and fifth→sixth). Dashed lines show shift timings at which the shift gear stage is switched to the lower speed side (sixth→fifth, fifth→fourth, fourth→third, third→second, and second→first).

The Q map 88 is a shift map made with more emphasis on the driving force than the D map 86 and has a larger region in which the transmission gear ratio is low than the D map 86. Due to this, in the Q map 88, at least the shift timings at which the shift gear stage is switched to the higher speed side are later than in the D map 86. Specifically, in the Q map 88, the shift timings at which the shift gear stage is switched to the higher speed side on the basis of the vehicle speed are set later than in the D map 86.

Specifically, the vehicle speeds of the shift timings at which the shift gear stage is switched to the higher speed side are set higher in the Q map 88 than in the D map 86. Therefore, even when the vehicle 12 is traveling at the vehicle speed of the shift timing at which the shift gear stage is switched to the higher speed side (e.g. third→fourth) in the D map 86, with the Q map 88, the shift gear stage is not switched to the higher speed side (e.g. third→fourth) and it is not until a vehicle speed higher than this vehicle speed is obtained that the shift gear stage is switched to the higher speed side (e.g. third→fourth). Due to this, the shift timings in the Q map 88 are late compared with the D map 86.

Figure 5:
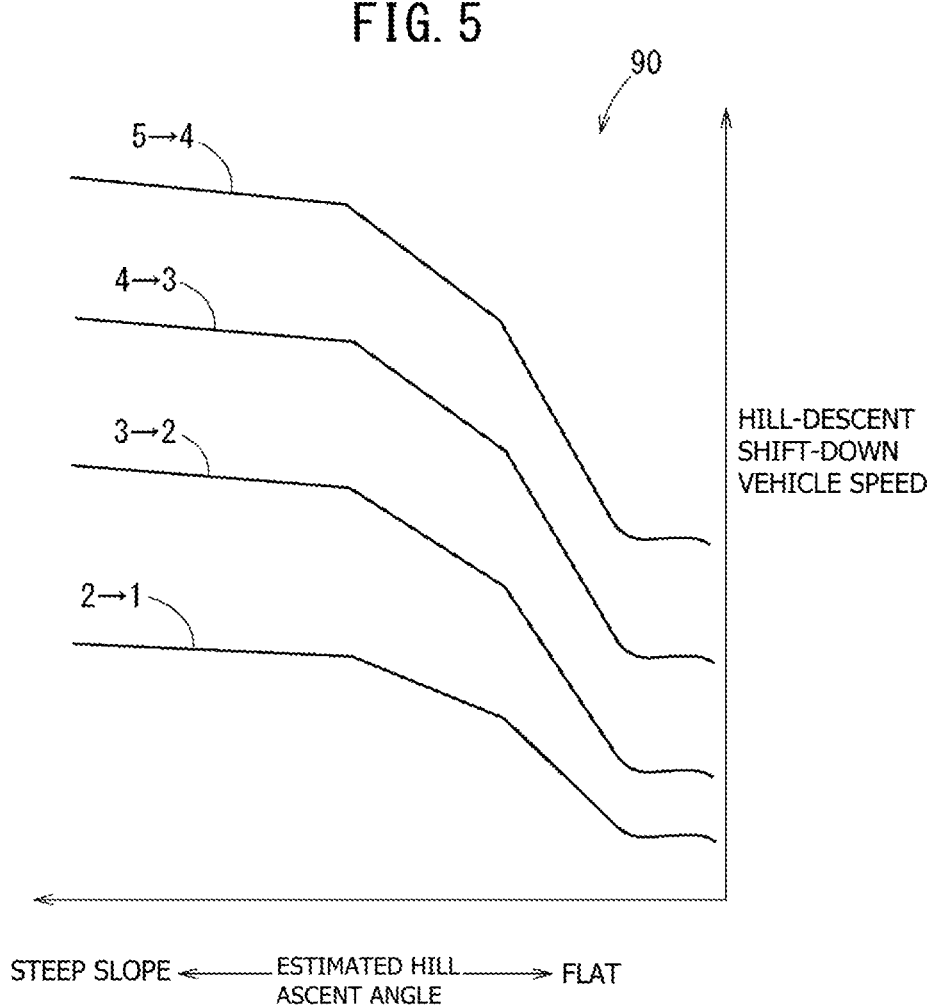
FIG. 5 is a diagram showing a shift-down shift map.

FIG. 5 is a diagram showing the shift-down shift map 90. In this map, gear shift timings of the automatic transmission 20 according to an estimated hill ascent angle θ (see FIG. 7) and the vehicle speed (hill-descent shift-down vehicle speed) when the automatic transmission 20 automatically carries out a shift-down in hill descent traveling of the vehicle 12 (in traveling on a downhill) are set.

Specifically, solid lines in FIG. 5 show shift timings at which the shift gear stage is switched to the lower speed side (fifth→fourth, fourth→third, third→second, and second→first) and show that the shift gear stage is set to the lower speed side as the slope of a road surface 92 (FIG. 7) becomes steeper in hill descent traveling. Furthermore, it is desirable that, also in the shift-down shift map 90, the hill-descent shift-down vehicle speeds are set higher than the shift-down vehicle speeds in the D map 86 similarly to the Q map 88.

The estimated hill ascent angle θ refers to a hill ascent angle estimated by the hill ascent angle estimator 80 while the vehicle 12 is traveling on the road surface 92. In this case, the hill ascent angle is a concept including the inclination angle of the road surface 92 according to a slope sin θ of the upward direction (hill ascent direction) (inclination angle of an uphill) and the inclination angle of the road surface 92 according to the slope sin θ of the downward direction (hill descent direction) (inclination angle of a downhill). Estimation processing of the estimated hill ascent angle θ by the hill ascent angle estimator 80 will be described later.

Figure 6:
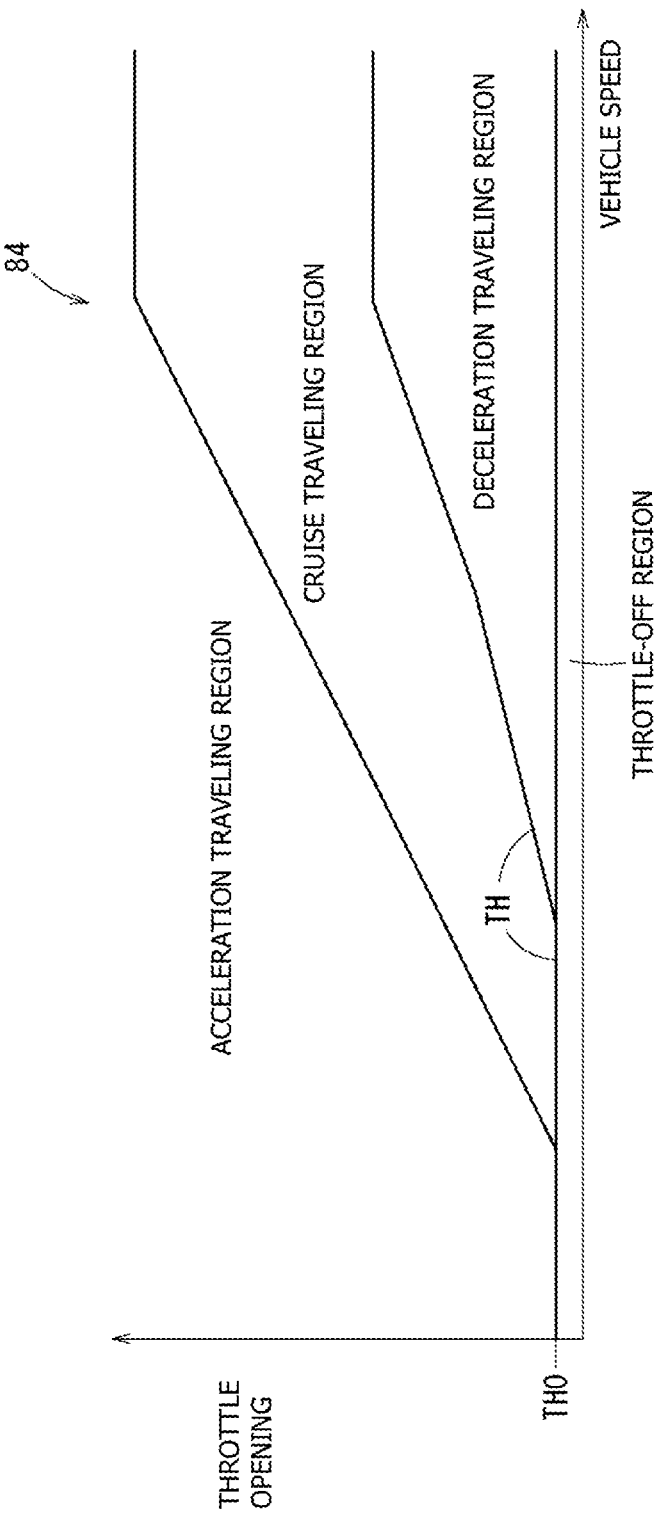
FIG. 6 is a diagram showing a traveling state discrimination map.

FIG. 6 is a diagram showing the traveling state discrimination map 84. The traveling state discrimination map 84 is marked off into an acceleration traveling region, a cruise traveling region, a deceleration traveling region, and a throttle-off region according to the throttle opening and the vehicle speed. Therefore, by using the traveling state discrimination map 84, it can be determined which region the traveling state of the vehicle 12 corresponds to among the acceleration traveling region, the cruise traveling region, the deceleration traveling region, and the throttle-off region from the present throttle opening and vehicle speed.

The throttle-off region is a region in which the throttle opening is equal to or lower than a predetermined value TH0, i.e. a region in which the throttle opening is near zero. When the driver 61 is carrying out brake operation, basically the driver 61 does not operate the throttle grip. In this case, the vehicle 12 is in the throttle-off region. Furthermore, in the throttle-off region and the deceleration traveling region, the vehicle 12 is in the deceleration state in which at least it is difficult to keep on traveling on an uphill. In FIG. 6, the throttle opening on the boundary line between the set of the throttle-off region and the deceleration traveling region and the set of the acceleration traveling region and the cruise traveling region is shown as a threshold TH. The threshold TH is TH0 until the vehicle speed becomes a predetermined value, and increases according to the vehicle speed after the vehicle speed surpasses the predetermined value.

Referring to FIG. 2, in the case in which the automatic transmission 20 (see FIG. 1) is set to the automatic shift mode in the drive range state, the traveling mode switching unit 70 switches the mode from the automatic shift mode to the manual shift mode when any of the traveling mode changeover switch 38, the shift-up switch 40, and the shift-down switch 42 is operated. The automatic transmission controller 66 is thereby set to the manual shift mode and switches the shift gear stage of the automatic transmission 20 in response to operation of the shift-up switch 40 and the shift-down switch 42 by the driver 61. Therefore, when the automatic transmission controller 66 is set to the manual shift mode, the shift gear stage is not automatically switched.

By using the traveling state discrimination map 84, the traveling mode switching unit 70 discriminates the traveling state of the vehicle 12 when manual operation is carried out from the throttle opening and the vehicle speed when one of the shift-up switch 40 and the shift-down switch 42 is operated. By using the traveling state discrimination map 84, the traveling mode switching unit 70 discriminates the traveling state of the vehicle 12 after the manual operation from the throttle opening and the vehicle speed after the one of the shift-up switch 40 and the shift-down switch 42 is operated.

The traveling mode switching unit 70 automatically reverts from the manual shift mode to the automatic shift mode on the basis of the operation of the shift-up switch 40 and the shift-down switch 42 and the traveling states at the time of the manual shift operation and after the manual shift operation.

When the automatic shift mode is selected, the automatic shift mode switching unit 72 sets the map used for switching of the shift gear stage of the automatic transmission 20 to the D map 86 in principle. On the other hand, if a predetermined condition such as a condition that the estimated hill ascent angle θ is equal to or larger than a certain value is satisfied, the automatic shift mode switching unit 72 switches the map used for switching of the shift gear stage from the D map 86 to the Q map 88.

Therefore, in principle, the automatic transmission controller 66 controls driving of the automatic transmission 20 by using the D map 86 to automatically switch the shift gear stage. Furthermore, if the shift map is switched from the D map 86 to the Q map 88 by the automatic shift mode switching unit 72, the automatic transmission controller 66 controls driving of the automatic transmission 20 by using the switched Q map 88 and automatically switches the shift gear stage.

The D map 86 and the Q map 88, the acceleration traveling region, the cruise traveling region, and the deceleration traveling region in the traveling state discrimination map 84, and driving control of the automatic transmission 20 by use of these maps are disclosed, for example, in Japanese Patent Laid-Open No. 2013-68246. Therefore, detailed description of these maps is omitted.

The slope estimator 76 estimates the slope sin θ of the road surface 92 on which the vehicle 12 travels.

Figure 7:
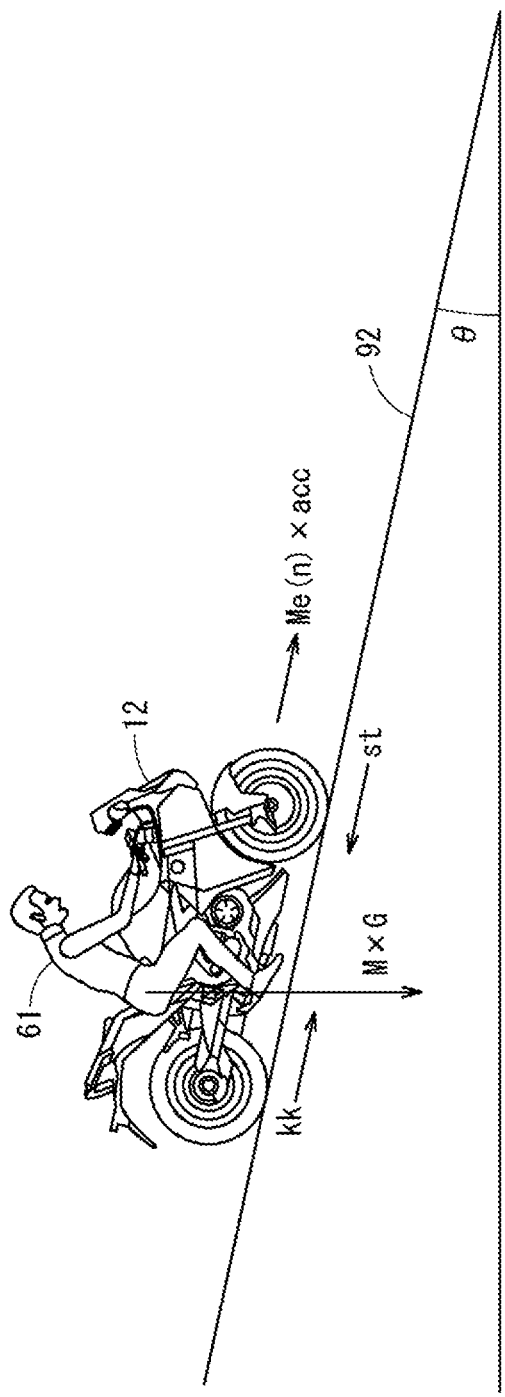
FIG. 7 is an explanatory diagram about the slope of a road surface and an estimation of a hill ascent angle.

FIG. 7 is an explanatory diagram of an estimation of the slope sin θ of the road surface 92 when the driver 61 rides the vehicle 12 and travels on the road surface 92. The slope sin θ can be obtained from the following expression (1) if parameters are defined, for example, as follows: the weight of the vehicle 12 is M; the gravitational acceleration is G; the driving force of the rear wheel 18 is kk; the running resistance of the vehicle 12 is st; the hill ascent angle as the slope angle of the road surface 92 is θ; the acceleration of the traveling vehicle 12 is acc; and the equivalent inertia mass of the vehicle 12 and the driver 61 is Me(n).

$$Me(n) \times acc = kk - st - M \times G \times \sin\theta \quad (1)$$

Therefore, the slope estimator 76 estimates the slope sin θ of the road surface 92 on which the vehicle 12 travels in accordance with the above expression (1). Furthermore, as described above, the signal indicating the vehicle speed and so forth are input to the ECU 26 every certain cycle and thus the slope estimator 76 can execute the estimation processing of the slope sin θ every certain cycle.

The above expression (1) is also described in Patent Document 1 and thus specific explanation of the respective physical amounts in expression (1) is omitted. The acceleration acc is time change of the vehicle speed and the rear wheel driving force kk is a physical amount derived from the engine rotation speed, the intake air temperature, the water temperature, and so forth. The running resistance st is a physical amount derived from the weight M of the vehicle 12, the vehicle speed, the gravitational acceleration G, and so forth. The equivalent inertia mass Me(n) is an amount obtained by converting the moment of inertia of the crankshaft 16 about each gear position n to mass and adding the mass of the vehicle 12 and the driver 61 to the mass resulting from the conversion.

The deceleration determiner 78 determines whether or not the vehicle 12 is in the deceleration state (deceleration traveling region or throttle-off region) by using the vehicle speed, the throttle opening, and the traveling state discrimination map 84. Specifically, the deceleration determiner 78 refers to the traveling state discrimination map 84 and discriminates the traveling state of the vehicle 12 from the present throttle opening and vehicle speed. If the traveling state corresponds to the deceleration traveling region or the throttle-off region, the deceleration determiner 78 determines that the vehicle 12 is in the deceleration state.

The hill ascent angle update determiner 74 determines whether or not to prohibit the estimation processing of the hill ascent angle θ by the hill ascent angle estimator 80. As described above, the slope estimator 76 can estimate the slope sin θ every certain cycle and thus the hill ascent angle estimator 80 can also estimate and update the hill ascent angle θ every certain cycle. In the following description, the hill ascent angle θ after update processing by the hill ascent angle estimator 80 will be referred to also as the estimated hill ascent angle θ.

The hill ascent angle update determiner 74 executes, every certain cycle, determination processing about whether or not the deceleration determiner 78 has determined the deceleration state of the vehicle 12 and the slope estimator 76 estimates the slope sin θ of the upward direction, i.e. an upward slope. If the vehicle 12 is in the deceleration state and the estimation result as an upward slope is obtained, the hill ascent angle update determiner 74 prohibits the update processing of the estimated hill ascent angle θ in the increase direction (upward direction) by the hill ascent angle estimator 80. On the other hand, if another result is obtained, the hill ascent angle update determiner 74 permits the update processing of the estimated hill ascent angle θ by the hill ascent angle estimator 80.

On the basis of the result of the determination of the update permission by the hill ascent angle update determiner 74, the hill ascent angle estimator 80 calculates the estimated hill ascent angle θ from the slope sin θ estimated by the slope estimator 76 and updates it.

The control device 10 according to embodiments of the present embodiment is configured as described above. Next, the operation of the control device 10 will be described with reference to FIGS. 8 to 13. In this operation explanation, the operation of the control device 10 will be described with reference also to FIGS. 1 to 7 according to need.

(1) First operation: the operation of the control device 10 in the case of carrying out a shift-down of the automatic transmission 20 by using the shift-down shift map 90 while the vehicle 12 is traveling on a downhill.

(2) Second operation: the operation of the control device 10 in the case of switching the shift map from the D map 86 to the Q map 88 on the basis of the magnitude of the estimated hill ascent angle θ and the number of times of brake operation while the vehicle 12 is traveling on a downhill.

(3) Third operation: the operation of the control device 10 in the case of switching the shift map from the D map 86 to the Q map 88 on the basis of the magnitude of the estimated hill ascent angle θ and the number of times of acceleration operation while the vehicle 12 is traveling on an uphill.

(4) Fourth operation: the operation of the control device 10 when the update processing of the estimated hill ascent angle θ is executed in the case in which the brake detector 54 involves failure (failure that precludes supply of the brake-on signal to the ECU 26).

These kinds of operation are carried out on the basis of a number of problems.

Specifically, in the vehicle 12 that is not equipped with a sensor capable of detecting the slope sin θ of the road surface 92, such as an acceleration sensor or an inclination sensor, shift timing is decided irrespective of the slope sin θ in some cases. As a result, on a downhill, the vehicle speed can quickly increase compared with a flat road, additionally the driver 61 might fee that the engine brake is insufficient in some cases. On the other hand, on an uphill, the running resistance st against the vehicle 12 increases and therefore the driver 61 might feel that the driving force of the rear wheel 18 is insufficient in some cases.

On the other hand, it can be costly to equip the vehicle 12 with an acceleration sensor or an inclination sensor. Therefore, without using these sensors, the slope sin θ and the estimated hill ascent angle θ of the road surface 92 are estimated by using detection results of various kinds of detecting units already mounted on the vehicle 12; the shift schedule is changed to one according to the estimated hill ascent angle θ to thereby improve shift timing on an uphill and a downhill.

The first operation to the fourth operation will be described below in order.

Figure 8:
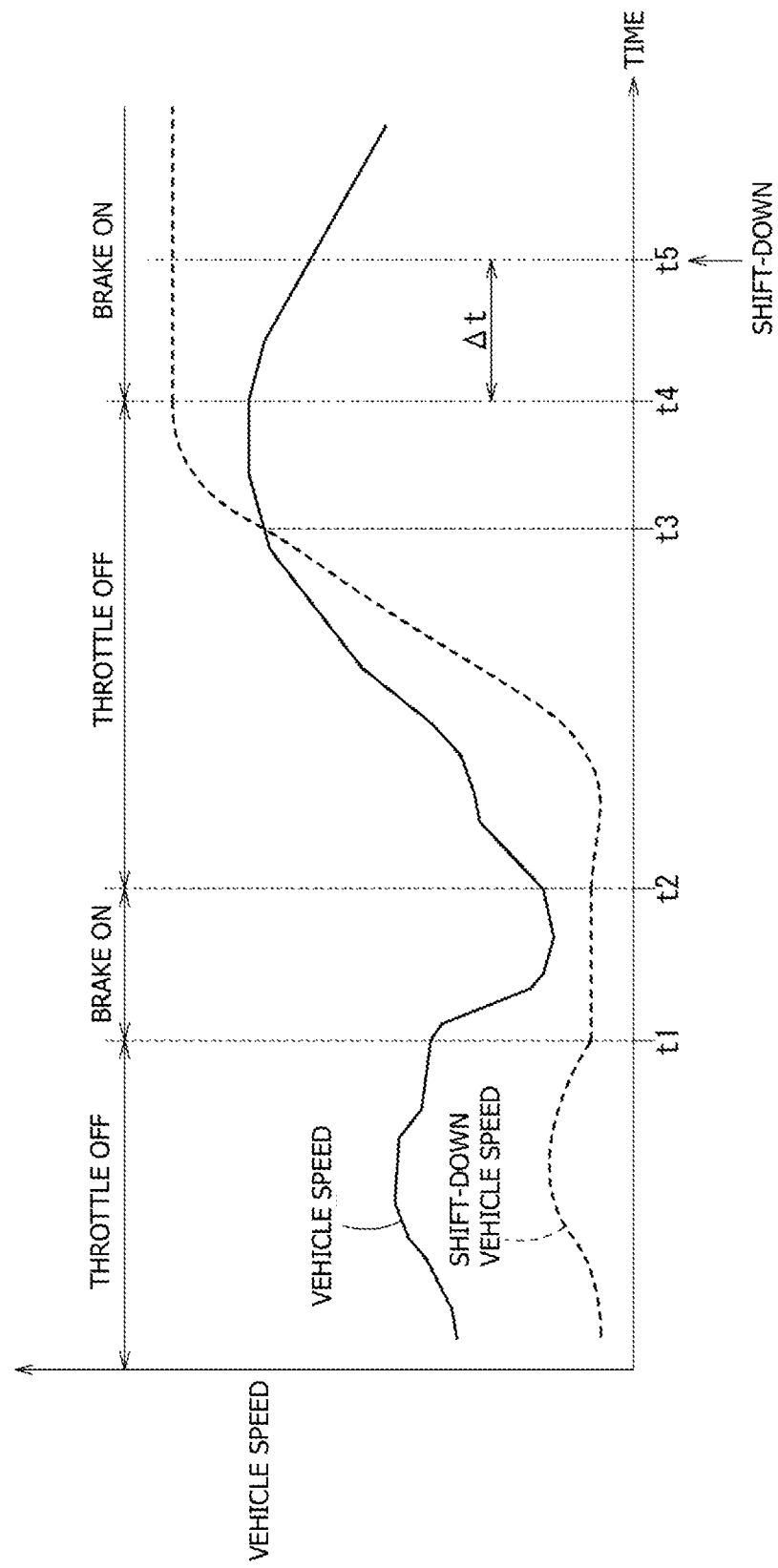
FIG. 8 is a timing chart diagrammatically representing first operation.

The first operation is the operation of the control device 10 regarding what timing a shift-down of the automatic transmission 20 is carried out at when the vehicle 12 is traveling on a downhill as shown in FIGS. 5 and 8.

In the first operation, the control device 10 decides the threshold of the vehicle speed when a shift-down of the automatic transmission 20 is carried out (shift-down vehicle speed) by using the shift-down shift map 90 of FIG. 5.

As shown by the solid lines in FIG. 5, the magnitude of the shift-down vehicle speed of each shift timing changes depending on the magnitude of the estimated hill ascent angle θ.

Therefore, if the rotation speed sensor 48, the vehicle speed sensor 52, the intake air temperature sensor 58, and the water temperature sensor 60 detect the engine rotation speed, the vehicle speed, the intake air temperature, and the water temperature, respectively, the slope estimator 76 estimates the slope sin θ of the road surface 92 of a downhill by the above expression (1) on the basis of signals input from the respective sensors 48, 52, 58, and 60 to the ECU 26. The hill ascent angle estimator 80 calculates the estimated hill ascent angle θ from the slope sin θ.

Next, the automatic shift mode switching unit 72 identifies the threshold line (solid line in FIG. 5) when a shift-down is carried out by, for example, one gear stage from the present gear position detected by the gear position sensor 50 in the shift-down shift map 90.

Next, the automatic shift mode switching unit 72 obtains the vehicle speed corresponding to the estimated hill ascent angle θ calculated by the hill ascent angle estimator 80 in the identified threshold line, and decides the obtained vehicle speed as the shift-down vehicle speed when a shift-down is carried out from the present gear position by one gear stage (hereinafter, referred to also as the hill-descent shift-down vehicle speed) at the estimated hill ascent angle θ.

In this case, it is desirable for the automatic shift mode switching unit 72 to identify the threshold line with which an engine brake equivalent to that in flat road operation is obtained and decide the hill-descent shift-down vehicle speed from the identified threshold line. Furthermore, as shown in FIG. 5, if the absolute value of the estimated hill ascent angle θ becomes larger, i.e. if the slope of the road surface 92 becomes steeper, the automatic shift mode switching unit 72 selects the solid line closer to the left side in FIG. 5 as the threshold line.

Moreover, if the estimated hill ascent angle θ is equal to or larger than a certain value (e.g. − several degrees), it is desirable for the automatic shift mode switching unit 72 not to execute the decision processing of the hill-descent shift-down vehicle speed by use of the shift-down shift map 90 in order to prevent erroneous determination. That is, if the estimated hill ascent angle θ is equal to or larger than the certain value, the automatic shift mode switching unit 72 carries out a shift-down of the automatic transmission 20 by using the Q map 88 of FIG. 4. On the other hand, in the case of flat road operation, the automatic shift mode switching unit 72 carries out a shift-down of the automatic transmission 20 by using the D map 86 of FIG. 3.

Therefore, in hill descent operation, the automatic shift mode switching unit 72 switches the shift map in order of D map 86→shift-down shift map 90→Q map 88 as the absolute value of the estimated hill ascent angle θ becomes larger. That is, in a state close to flat road traveling, the automatic shift mode switching unit 72 uses the D map 86 and makes the vehicle 12 travel at the shift gear stage on the higher speed side. On the other hand, in hill descent traveling in which the estimated hill ascent angle θ is on the steeper slope side, the automatic shift mode switching unit 72 uses the shift-down shift map 90 or the Q map 88 and causes a shift-down to the shift gear stage on the lower speed side as the vehicle speed becomes higher to make the vehicle 12 travel with an engine brake.

Similar to the specification of the braking down-shift, the motion of the vehicle body in the pitching direction is unstable immediately after the start of the deceleration of the vehicle 12 or immediately after a shift-down or the like. When a shift-down is carried out in this situation, the driver 61 feels a sense of discomfort in some cases. Therefore, contrivance to prevent the driver 61 from feeling such a sense of discomfort is necessary.

Furthermore, in hill descent operation, a situation in which the driver 61 wants to make the vehicle 12 coast is also assumed. In this case, the automatic transmission controller 66 carries out a shift-down of the automatic transmission 20 only when the brake-on signal is input from the brake detector 54 to the ECU 26, i.e. only when the driver 61 has the intention to decelerate the vehicle 12, which enables gear selection reflecting the intention of the driver 61.

Therefore, in hill descent operation, the automatic transmission controller 66 carries out a shift-down of the automatic transmission 20 in accordance with the following conditions.

[1] A shift-down of the automatic transmission 20 is permitted after the elapse of a certain time Δt from the time at which input of the brake-on signal from the brake detector 54 to the ECU 26 is started.

[2] If input of the brake-on signal from the brake detector 54 to the ECU 26 is absent, a shift-down of the automatic transmission 20 is not carried out even when the actual vehicle speed of the vehicle 12 detected by the vehicle speed sensor 52 falls below the hill-descent shift-down vehicle speed.

[3] After carrying out a shift-down, the automatic transmission controller 66 causes a timer (not shown) to work and temporarily sets the automatic transmission 20 to the shift-down-prohibited state to thereby avoid consecutive execution of a shift-down.

A specific description will be made with reference to FIG. 8 about the case of carrying out a shift-down of the automatic transmission 20 in hill descent operation in accordance with the above conditions [1] to [3].

The vehicle speed sensor 52 sequentially detects the vehicle speed of the vehicle 12 and outputs a signal indicating the detection result to the ECU 26. The slope estimator 76 estimates the slope sin θ in accordance with the above-described expression (1) and the hill ascent angle estimator 80 calculates the estimated hill ascent angle θ from the slope sin θ. The automatic shift mode switching unit 72 sequentially obtains the hill-descent shift-down vehicle speed from the shift-down shift map 90 of FIG. 5 on the basis of the estimated hill ascent angle θ calculated by the hill ascent angle estimator 80 and the gear position detected by the gear position sensor 50.

Therefore, as shown in FIG. 8, the actual vehicle speed of the vehicle 12 shown by a solid line and the hill-descent shift-down vehicle speed change over time.

If the throttle-off region (see FIG. 6), in which the throttle opening is equal to or lower than TH0, continues and then brake operation by the driver 61 is started at a timing t1, the brake-on signal is input from the brake detector 54 to the ECU 26. The actual vehicle speed thereby decelerates over time in a time zone t1 to t2 in which the brake operation is carried out. Also in the time zone t1 to t2, the vehicle 12 is in the throttle-off region.

Thereafter, if the driver 61 stops the brake operation at a timing t2 and the throttle operation by the driver 61 is also absent, the vehicle 12 coasts on the downhill. Due to this, the actual vehicle speed and the hill-descent shift-down vehicle speed increase over time.

Even if the hill-descent shift-down vehicle speed surpasses the actual vehicle speed at a timing t3, the automatic shift mode switching unit 72 does not immediately execute a shift-down of the automatic transmission 20 in obedience to the above-described condition [2]. That is, if the brake-on signal is not input and the traveling state corresponds to the throttle-off region, in which the throttle opening is equal to or lower than TH0, the automatic shift mode switching unit 72 determines that the driver 61 has the intention to coast the vehicle 12 and does not immediately carry out a shift-down even when the actual vehicle speed falls below the hill-descent shift-down vehicle speed.

Thereafter, if brake operation by the driver 61 is started at a timing t4 and the brake-on signal is input from the brake detector 54 to the ECU 26, the actual vehicle speed decelerates over time. Also in a time zone subsequent to t4, in which the brake operation is carried out, the vehicle 12 is in the throttle-off region.

Then, at a timing t5 after the elapse of a certain time Δt from the timing t4, the automatic shift mode switching unit 72 carries out a shift-down of the automatic transmission 20 in obedience to the above-described condition [1]. That is, in FIG. 8, the shift-down of the automatic transmission 20 is carried out at the timing t5, which is after the elapse of the certain time Δt from the timing t4, at which brake operation is started, and at which the actual vehicle speed is lower than that at the timing t4 and is lower than the hill-descent shift-down vehicle speed.

After the shift-down is carried out at the timing t5, the automatic shift mode switching unit 72 causes the timer to work and temporarily prohibits execution of a shift-down in a predetermined time from the timing t5. This can avoid consecutive execution of a shift-down. Furthermore, in the case of carrying out a shift-down from the hill-descent shift-down vehicle speed as the base, the shift-down is carried out when the actual vehicle speed decreases to the hill-descent shift-down vehicle speed irrespective of the above-described conditions [1] to [3] in terms of prevention of excessive lowering of the engine rotation speed.

Figure 9:
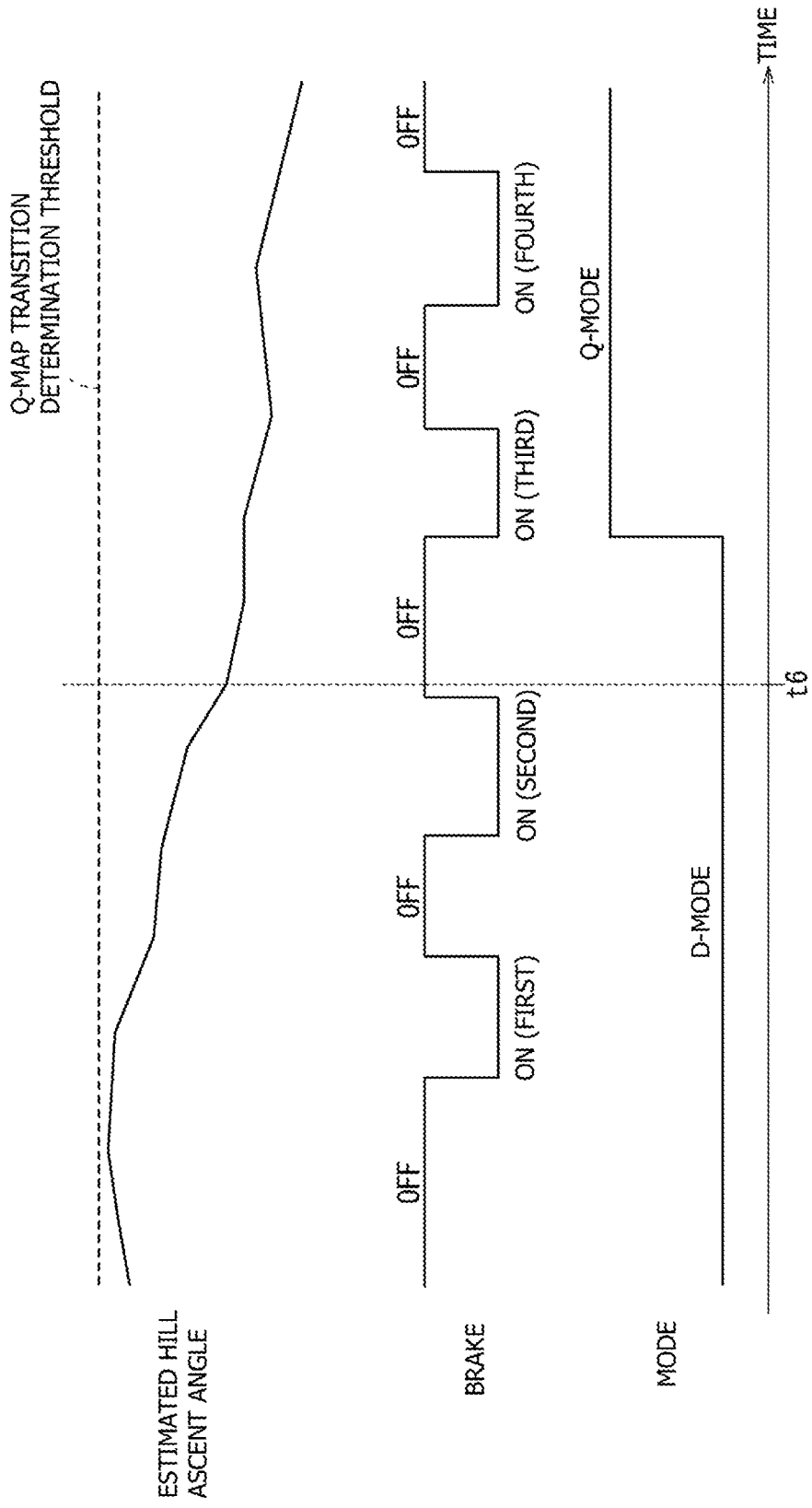
FIG. 9 is a timing chart diagrammatically representing second operation.

The second operation is the operation of the control device 10 regarding at what timing transition is made from the D map 86 to the Q map 88 about the shift map used for determination of the shift-down of the automatic transmission 20 when the vehicle 12 is traveling on a downhill as shown in FIG. 9.

In hill descent operation, the vehicle 12 needs to be made to travel with ensuring of a proper engine brake. For this purpose, it is important to hasten execution of the shift-down compared with flat road traveling and shift the vehicle speed at the time of a shift-up (shift-up vehicle speed) in acceleration toward the higher speed side to prevent the frequent occurrence of change in the shift gear stage of the automatic transmission 20 (gear shift).

In the Q map 88 of FIG. 4, the shift-up vehicle speeds shown by solid lines are set high compared with the D map 86 of FIG. 3. Therefore, also in hill descent traveling, more proper gear shifts can be carried out by selecting the Q map 88. Therefore, in the second operation, if a downhill is sensed in the traveling state in which the automatic transmission 20 is controlled by using the D map 86 (hereinafter, also referred to as the D mode), transition is made to the traveling state in which the automatic transmission 20 is controlled by using the Q map 88 (hereinafter, referred to also as the Q mode).

Therefore, although traveling in the D mode normally, the vehicle 12 transitions from the D mode to the Q mode if a predetermined transition condition is satisfied, and thereafter returns from the Q mode to the D mode if a predetermined return condition is satisfied.

The transition condition for transition from the D mode to the Q mode is as follows. Specifically, if the estimated hill ascent angle θ is smaller than a certain value (− several degrees), in other words, if the slope sin θ of the hill descent direction is large, the shift map is switched from the D map 86 to the Q map 88 when brake operation by the driver 61 is carried out n times. However, if, in the count of the number of times of brake operation, the estimated hill ascent angle θ is equal to or larger than the certain value and the throttle opening is equal to or higher than TH and the cruise traveling of the vehicle 12 continues for a time Ta or longer, the count is reset to zero to prevent the transition from the D mode to the Q mode.

The return condition for return to the D mode after transition to the Q mode is as follows. Specifically, if the road on which the vehicle 12 travels is a flat road or an uphill whose estimated hill ascent angle θ is equal to or larger than the certain value (− several degrees) and the cruise operation of the vehicle 12 continues for the predetermined time, it is determined that the state in which the engine brake is unnecessary continues and the vehicle 12 returns from the Q mode to the D mode.

The transition conditions among the above-described respective conditions will be specifically described with reference to a timing chart of FIG. 9.

As shown in FIG. 9, if the estimated hill ascent angle θ is smaller than a Q-map transition determination threshold and the vehicle 12 is traveling on a downhill, the brake detector 54 outputs, to the ECU 26, the brake-on signal (ON) indicating brake operation by the driver 61 or the brake-off signal (OFF) indicating that brake operation is not being carried out at a certain time interval.

When the driver 61 starts a third round of brake operation at a timing t6 and the brake-on signal responding to the third round of brake operation is supplied from the brake detector 54 to the ECU 26, the automatic shift mode switching unit 72 counts the number of times of brake operation by using a counter (not shown) and determines that the number of times of brake operation has reached a threshold N (e.g. N=3) for determination of transition from the D map 86 to the Q map 88. Then, the automatic shift mode switching unit 72 switches the shift map used for the gear shift of the automatic transmission 20 from the D map 86 to the Q map 88. The traveling state of the vehicle 12 is thereby switched from the D mode to the Q mode.

Figure 10:
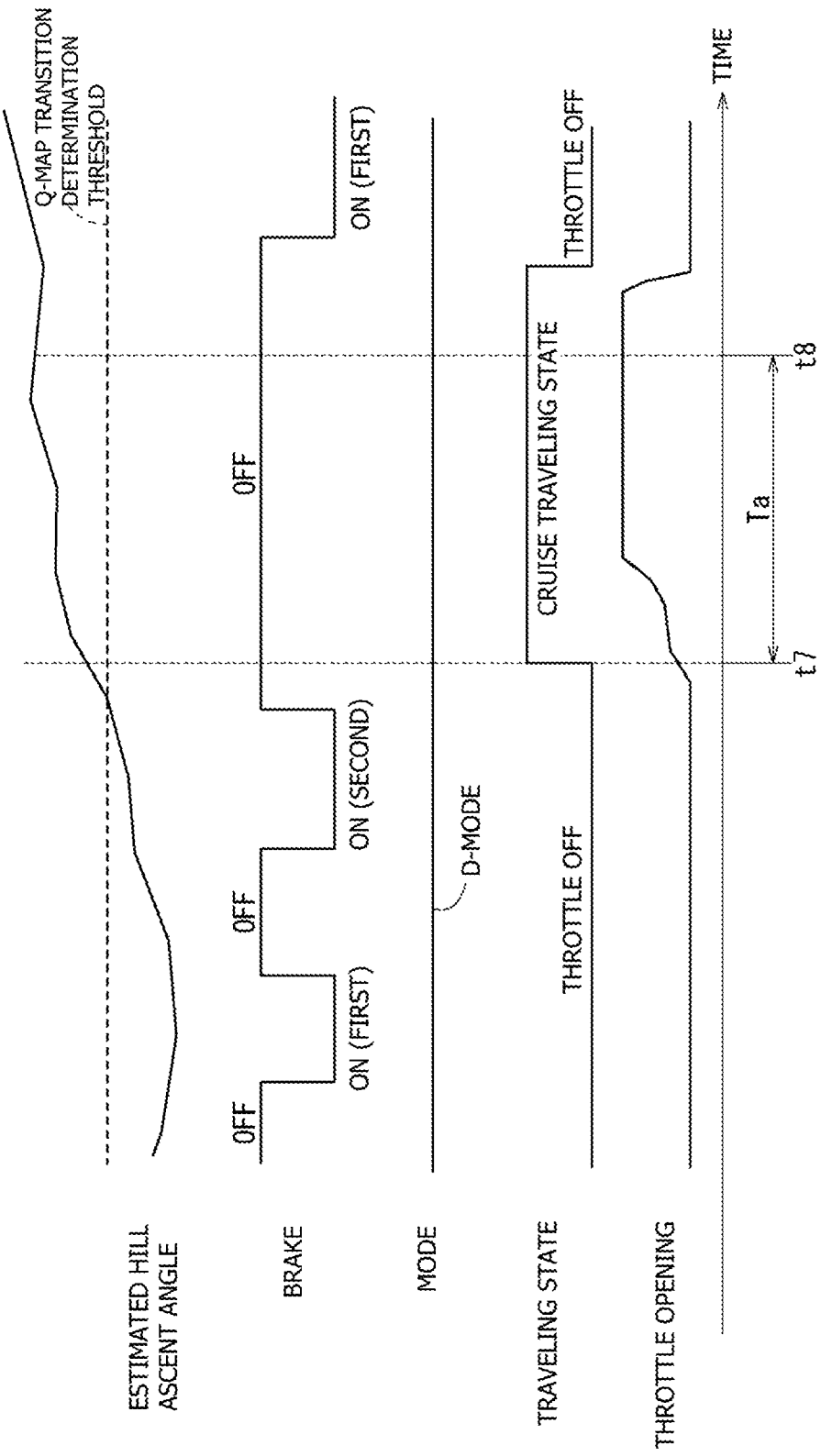
FIG. 10 is a timing chart diagrammatically representing the second operation.

On the other hand, as shown in FIG. 10, the estimated hill ascent angle θ can surpass the Q-map transition determination threshold and thereafter, at a timing t7, the throttle opening increases attributed to throttle operation by the driver 61 and the vehicle 12 makes transition from the throttle-off region to the cruise traveling region. In this case, at a timing t8 after the time Ta elapses from the timing t7 while the vehicle 12 remains in the cruise operation region, the automatic shift mode switching unit 72 resets the count of the number of times of brake operation by the counter. As a result, when the first brake operation is carried out after the timing t8, the counter counts this brake operation as a first round of brake operation. Therefore, in the case of FIG. 10, the vehicle 12 maintains the D mode.

Figure 11:
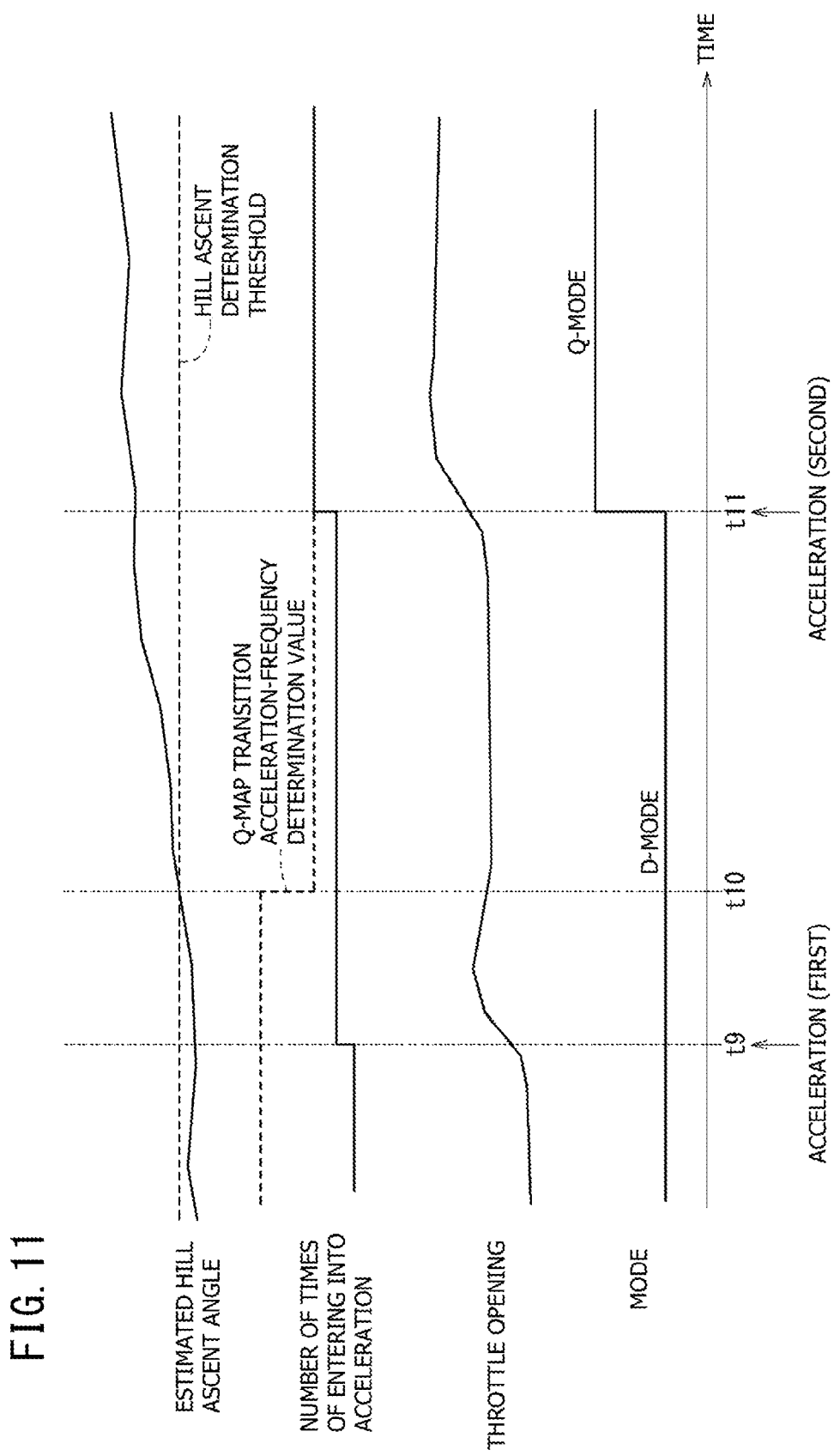
FIG. 11 is a timing chart diagrammatically representing third operation.
Figure 12:
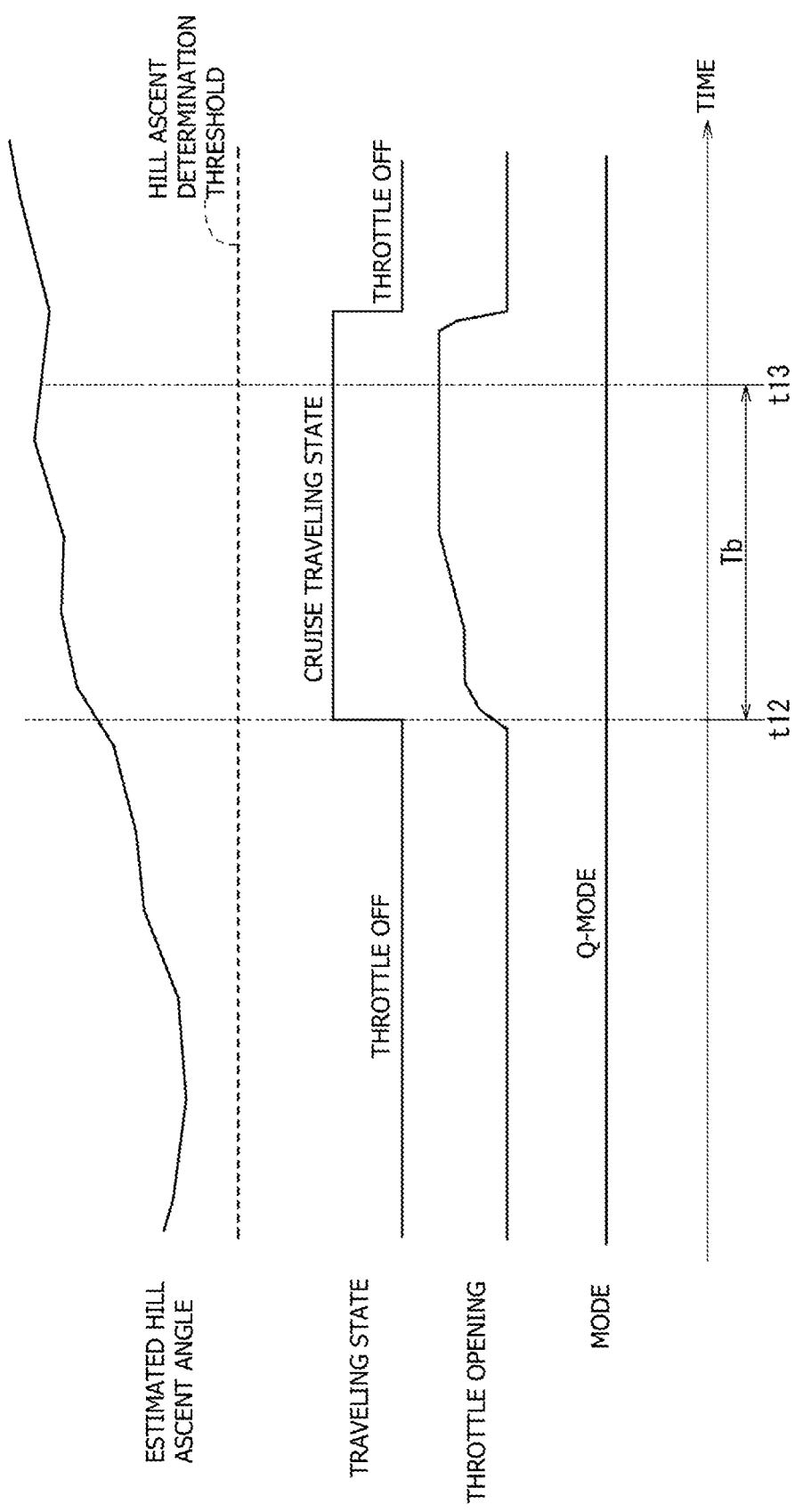
FIG. 12 is a timing chart diagrammatically representing the third operation.

The third operation is the operation of the control device 10 regarding at what timing transition is made from the D map 86 to the Q map 88 about the shift map used for determination of the shift-down of the automatic transmission 20 when the vehicle 12 is traveling on an uphill as shown in FIGS. 11 and 12.

In hill ascent traveling, the vehicle 12 needs to be able to travel with a proper driving force. For this purpose, as with the second operation (see FIGS. 9 and 10), it is important to hasten execution of the shift-down compared with flat road traveling and shift the shift-up vehicle speed in acceleration toward the higher speed side to prevent the frequent occurrence of the gear shift.

As with the second operation, more proper gear shifts can be carried out by selecting the Q map 88 also in the third operation. For this purpose, it is desirable to make transition to the Q map 88 early in hill ascent operation and allow traveling in the state in which this Q map 88 is kept.

The transition condition for transition from the D mode to the Q mode is as follows. Under this transition condition, transition from the D map 86 to the Q map 88 is made on the basis of the relationship between the number of times of operation of the throttle grip by the driver 61, i.e. the number of times of entering into acceleration of the vehicle 12, and a Q-map transition acceleration-frequency determination value. In this case, if the estimated hill ascent angle θ is larger than a certain value (+ several degrees), i.e. the slope sin θ is large in the hill ascent direction, the Q-map transition acceleration-frequency determination value is switched to a value smaller than that of the normal state. If the number of times of entering into acceleration reaches the Q-map transition acceleration-frequency determination value after the switching, transition is made from the D map 86 to the Q map 88. Meanwhile, if the estimated hill ascent angle θ is larger than the certain value (+ several degrees) and the slope sin θ is large in the hill ascent direction, the Q map 88 is kept and return to the D map 86 is prevented irrespective of whether or not the vehicle 12 keeps cruise traveling.

With reference to timing charts of FIGS. 11 and 12, the third operation will be specifically described.

If the vehicle 12 is in the D mode, when a first round of acceleration is carried out at a timing t9 by throttle operation by the driver 61 and the estimated hill ascent angle θ surpasses a hill ascent determination threshold at a timing t10, the automatic shift mode switching unit 72 switches the value of the Q-map transition acceleration-frequency determination value to a value smaller than that of the normal state. The automatic shift mode switching unit 72 has a counter (not shown) and counts the number of times of acceleration of the vehicle 12.

If a second round of acceleration is carried out at a timing t11 by throttle operation by the driver 61, and the number of times counted by the counter reaches the Q-map transition acceleration-frequency determination value after the switching, the automatic shift mode switching unit 72 switches the shift map used for gear change from the D map 86 to the Q map 88.

As above, in the case of FIG. 11, in hill ascent traveling, the Q-map transition acceleration-frequency determination value is set smaller so that the shift map may be switched from the D map 86 to the Q map 88 at a smaller number of times of acceleration. Thus, transition to the Q map 88 can be made early compared with the case of traveling on a flat road. In FIG. 11, the case in which the Q-map transition acceleration-frequency determination value is lowered (from three) to two is described as one example. However, this determination value can be set as appropriate according to the traveling situation of the vehicle 12.

On the other hand, as shown in FIG. 12, in the case in which the vehicle 12 is in the throttle-off region after switching to the Q map 88, if the driver 61 carries out throttle operation at a timing t12, the throttle opening increases and the vehicle 12 makes transition to the cruise operation region. If the state in which the estimated hill ascent angle θ surpasses the hill ascent determination threshold continues, the automatic shift mode switching unit 72 does not make return from the Q map 88 to the D map 86. As a result, the Q mode is kept even after a time Tb elapses from the timing t12 to a timing 13 while the vehicle 12 remains in the cruise traveling state.

Figure 13:
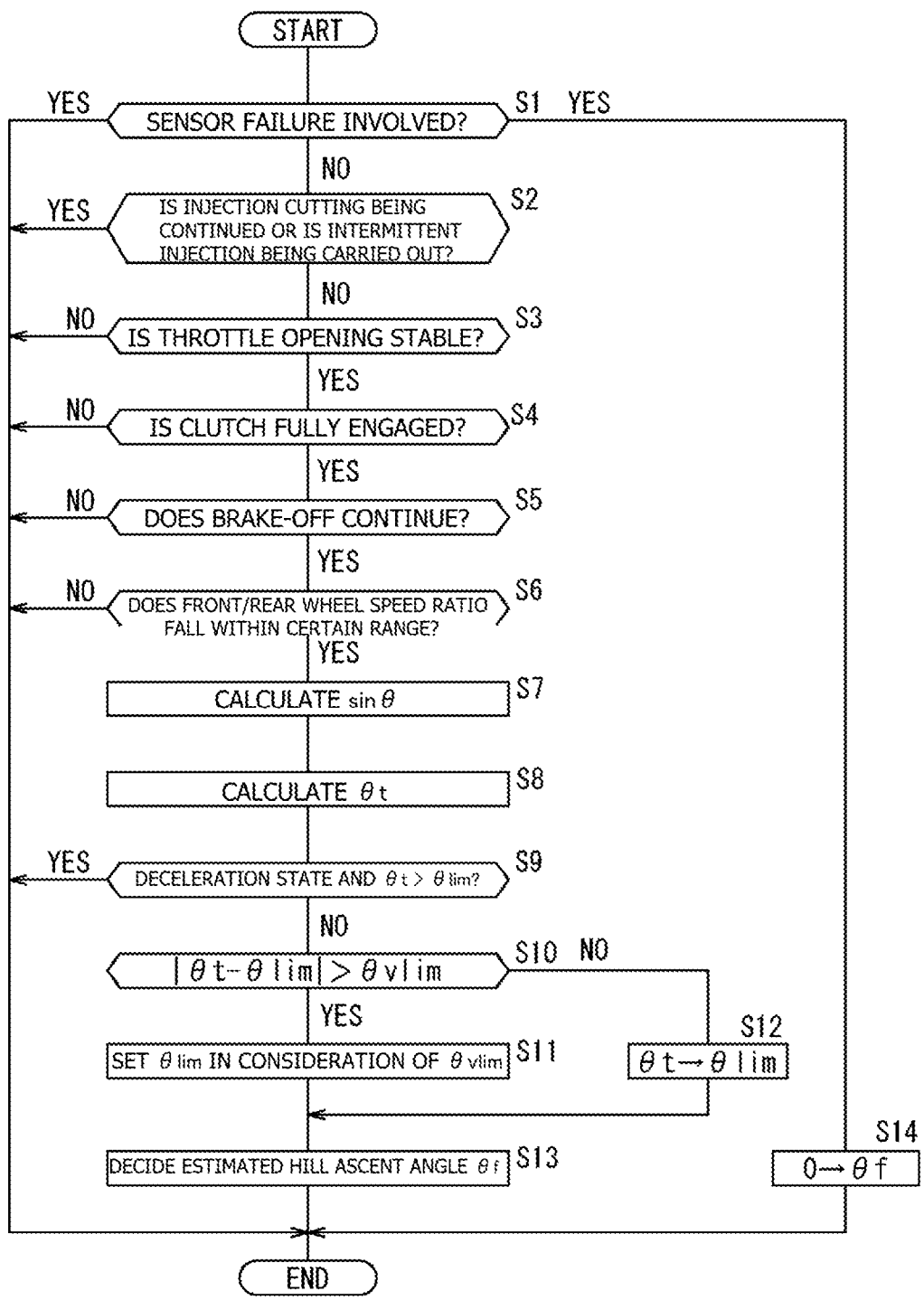
FIG. 13 is a flowchart diagrammatically representing fourth operation.

The fourth operation relates to update processing of the estimated hill ascent angle θ in the case in which the brake detector 54 (see FIG. 1) is in failure and the brake-on signal cannot be supplied from the brake detector 54 to the ECU 26 even when the driver 61 carries out brake operation as shown in a flowchart of FIG. 13.

If the brake detector 54 is in failure, the brake-on signal is not supplied from the brake detector 54 to the ECU 26 even when the driver 61 (see FIG. 7) carries out brake operation. As a result, because of the absence of supply of the brake-on signal, the automatic transmission controller 66 (see FIG. 2) determines that the driver 61 does not intend to decelerate the vehicle 12 and continuously executes the update processing of the estimated hill ascent angle θ. In addition, the automatic transmission controller 66 continues to carry out gear change of the automatic transmission 20 even when the vehicle 12 is traveling downhill.

Specifically, in the case in which the power of the engine 14 is transmitted from the crankshaft 16 to the rear wheel 18 via the automatic transmission 20, when the vehicle speed decelerates, the automatic transmission controller 66 determines whether the deceleration is caused by brake operation by the driver 61 or by traveling of the vehicle 12 on a flat road or an uphill.

However, if the brake detector 54 is in failure, even when the driver 61 carries out brake operation with the intention to decelerate the vehicle 12 while the vehicle 12 is traveling downhill, the brake-on signal is not input from the brake detector 54 to the ECU 26 and thus there is a possibility that the automatic transmission controller 66 erroneously determines that the vehicle 12 is traveling on a flat road or uphill.

However, if the traveling state of the vehicle 12 corresponds to the throttle-off region or the deceleration traveling region as in the traveling state discrimination map 84 of FIG. 6, it is difficult for the vehicle 12 to at least continue to travel on an uphill. Furthermore, while the driver 61 is carrying out brake operation, basically the throttle opening is equal to or lower than the threshold TH (or TH0) and the vehicle 12 is in the throttle-off region or the deceleration traveling region.

It will also be possible to equip the vehicle 12 with an angle sensor and sense an uphill, a flat road, or a downhill in order to prevent such erroneous determination. However, providing the angle sensor requires high cost. Therefore, to prevent the erroneous determination without high cost, a method that allows an estimation of an uphill, a flat road, or a downhill by using various kinds of detecting units with which the vehicle 12 is equipped needs to be established.

Therefore, in the fourth operation, the update processing of the hill ascent angle in the increase direction is prohibited if the traveling or operational state of the vehicle 12 is in the throttle-off region or the deceleration traveling region. An erroneous estimation of the estimated hill ascent angle θ when the brake detector 54 is in failure is thereby avoided.

With reference to the flowchart of FIG. 13, the fourth operation will be specifically described.

In a step S1, the hill ascent angle update determiner 74 determines whether or not the intake air pressure sensor 56, the intake air temperature sensor 58, and the water temperature sensor 60 are in failure.

If these sensors 56 to 60 are not in failure (step S1: NO), in the next step S2, the hill ascent angle update determiner 74 determines whether or not the injector 32 is continuing injection cutting or whether or not the injector 32 is carrying out intermittent injection. Specifically, the hill ascent angle update determiner 74 determines whether or not the injection cutting or the intermittent injection is being carried out through execution of revolution cutting control to prevent the excessive rotation of the engine 14 when traction control is being actuated or a speed limiter (not shown) is being actuated or the engine 14 is in the maximum output state.

If the negative determination result is obtained in both kinds of determination processing in the step S2 (step S2: NO), in the next step S3, the hill ascent angle update determiner 74 determines whether or not the amount of time change of the throttle opening falls within a certain range continuously for a predetermined time.

If the throttle opening is not in a transient state but in a stable state (step S3: YES), in the next step S4, the hill ascent angle update determiner 74 determines whether or not the clutch of the automatic transmission 20 is fully engaged, i.e. whether or not the clutch is in the locked state.

If the correspondence relationship among the engine rotation speed, the throttle opening, and the driving force of the rear wheel 18 can be kept due to the locked state of the clutch (step S4: YES), in the next step S5, the hill ascent angle update determiner 74 determines whether or not input of the brake-off signal from the brake detector 54 to the ECU 26 continues for a certain time.

If the off-state of the brake 62 continues and there is no possibility that it is erroneously determined that the road surface 92 has an upward slope due to increase in the running resistance st attributed to brake operation (step S5: YES), in the next step S6, the hill ascent angle update determiner 74 determines whether or not the front/rear wheel speed ratio, which is the ratio between the wheel speed of a front wheel (not shown) and the wheel speed of the rear wheel 18 (vehicle speed detected by the vehicle speed sensor 52), falls within a certain range continuously for a predetermined time. The wheel speed of the front wheel may be detected by using another vehicle speed sensor (not shown).

If the front/rear wheel speed ratio falls within the certain range continuously for the predetermined time and the correspondence relationship between the vehicle speed detected by the vehicle speed sensor 52 and the driving force of the rear wheel 18 can be kept (step S6: YES), the hill ascent angle update determiner 74 permits execution of estimation processing of the slope $\sin \theta$ by the slope estimator 76. Due to this, in a step S7, the slope estimator 76 receives the permission decision by the hill ascent angle update determiner 74 and estimates the slope $\sin \theta$ from the above-described expression (1).

In the next step S8, the hill ascent angle estimator 80 calculates a hill ascent angle $\theta t$ from the slope $\sin \theta$ estimated by the slope estimator 76. The hill ascent angle $\theta t$ calculated in the step S8 is a hill ascent angle tentatively obtained from the slope $\sin \theta$ and is different from an estimated hill ascent angle $\theta f$ that is finally decided as the estimated hill ascent angle $\theta$ by the hill ascent angle estimator 80 and will be described later.

In the next step S9, the deceleration determiner 78 determines whether or not the present traveling state of the vehicle 12 is in the deceleration traveling region or the throttle-off region. Furthermore, the hill ascent angle update determiner 74 determines whether or not the hill ascent angle $\theta t$ calculated by the hill ascent angle estimator 80 is larger than a predetermined limit angle $\theta$lim.

If, in the step S9, the deceleration determiner determines that the present traveling state of the vehicle 12 is not in the deceleration traveling region or the throttle-off region and the hill ascent angle update determiner 74 determines that $\theta t > \theta$lim is not satisfied (step S9: NO), the hill ascent angle update determiner 74 determines that there is no possibility that it is erroneously determined that the road surface 92 is an uphill.

In the next step S10, the hill ascent angle update determiner 74 determines whether or not the absolute value $|\theta t - \theta \text{lim}|$ of the difference between the hill ascent angle $\theta t$ and the limit angle $\theta$lim is larger than a predetermined hill ascent angle change limit value $\theta$vlim. The hill ascent angle change limit value $\theta$vlim is the limit value of the amount of time change of the hill ascent angle $\theta t$ and is a value set in advance.

If $|\theta t - \theta \text{lim}| > \theta$vlim is satisfied (step S10: YES), because the change in the hill ascent angle $\theta t$ is large, the hill ascent angle update determiner 74 determines that limit processing of the upper/lower limit needs to be executed on the hill ascent angle $\theta t$. Thus, in the next step S11, in response to the determination result by the hill ascent angle update determiner 74, the hill ascent angle estimator 80 sets the limit angle $\theta$lim in consideration of the hill ascent angle change limit value $\theta$vlim.

Specifically, to execute the limit processing of the upper/lower limit on the hill ascent angle $\theta t$, the hill ascent angle estimator 80 sets a new limit angle Klm in accordance with the following expression (2) or (3).

$$\theta\text{lim} + \theta v\text{lim} \rightarrow \theta\text{lim} \quad (2)$$

$$\theta\text{lim} - \theta v\text{lim} \rightarrow \theta\text{lim} \quad (3)$$

That is, if the hill ascent angle $\theta t$ tentatively estimated deviates from a predetermined range, the hill ascent angle estimator 80 limits the hill ascent angle $\theta t$ to the limit angle $\theta$lim.

On the other hand, if $|\theta t - \theta \text{lim}| \geq \theta$vlim is satisfied (step S10: NO), because the change in the hill ascent angle $\theta t$ is small, the hill ascent angle update determiner 74 determines that the limit processing of the upper/lower limit on the hill ascent angle $\theta t$ is unnecessary. In the next step S12, in response to the determination result by the hill ascent angle update determiner 74, the hill ascent angle estimator 80 sets the hill ascent angle $\theta t$ as a new limit angle $\theta$lim ($\theta t \rightarrow \theta$lim).

In the next step S13, the hill ascent angle estimator 80 decides the estimated hill ascent angle $\theta f$ obtained in the present update processing on the basis of the following expression (4) by using the new limit angle Klm set in the step S11 or the step S12 and a filter coefficient NF set in advance.

$$(\text{previous } \theta f) + NF \times \{\theta\text{lim} - (\text{previous } \theta f)\} \rightarrow (\text{present } \theta f) \quad (4)$$

Therefore, in the control device 10, the estimated hill ascent angle $\theta f$ can be sequentially updated as the final estimated hill ascent angle $\theta$ by repeatedly executing the processing of the steps S1 to S13 in FIG. 13 every certain time.

If at least one sensor of the intake air pressure sensor 56, the intake air temperature sensor 58, and the water temperature sensor 60 is in failure in the step S1 (step S1: YES), the hill ascent angle estimator initializes the estimated hill ascent angle $\theta f$ to reset it to 0° in the next step S14 or skips the present update processing. This is because, if at least one sensor of these sensors 56 to 60 is in failure, it is difficult to properly control the engine 14 and so forth of the vehicle 12 and it is impossible to accurately estimate the slope $\sin \theta$ on the basis of expression (1) in the step S7.

Furthermore, the present update processing is also skipped if the positive determination result is obtained in the step S2 or the step S9 and also if the negative determination result is obtained in any step among the steps S3 to S6.

In particular, if the positive determination result is obtained in the step S9 (step S9: YES), there is a possibility that it is erroneously determined that the hill ascent angle $\theta$ increases although the vehicle 12 is in the deceleration state.

In such a case, the update processing of FIG. 13 is immediately ended and the decision processing of the estimated hill ascent angle θf is not executed. This can avoid the possibility that the estimated hill ascent angle θf is erroneously decided.

As described above, according to the control device 10 in accordance with certain embodiments, an acceleration operation amount (operation amount of the throttle grip, throttle opening) is not given to the vehicle 12 when the driver 61 is carrying out brake operation. Therefore, as described also in the fourth operation of the present embodiment, when the throttle opening is equal to or lower than the threshold TH (or TH0), the deceleration determiner 78 determines that the driver 61 does not want acceleration of the vehicle 12 and this vehicle 12 is in the deceleration state (deceleration traveling region or throttle-off region).

As a result, if the slope estimator 76 estimates that the road surface 92 has an upward slope and the deceleration determiner 78 determines that the vehicle 12 is in the deceleration state, the hill ascent angle update determiner 74 prohibits the update processing of the estimated hill ascent angle θf (θ) in the increase direction by the hill ascent angle estimator 80. The occurrence of acceleration that is not intended by the driver 61 can be thereby prevented even if the brake detector 54 is in failure. As above, in the fourth operation, erroneous determination in the ECU 26 when the brake detector 54 is in failure can be prevented and thus control of the automatic transmission 20 in conformity with the intention of the driver 61 is enabled.

In certain embodiments, as shown in the traveling state discrimination map 84 of FIG. 6, the threshold TH set between the set of the deceleration traveling region and the throttle-off region and the set of the cruise traveling region and the acceleration traveling region changes according to change in the vehicle speed. Specifically, when the vehicle speed increases, this threshold TH increases. Due to this, in high-speed traveling, the running resistance st against the vehicle 12 becomes higher and thus the driver 61 gives a larger acceleration operation amount to the vehicle 12. Therefore, the threshold TH is increased also in view of the amount of rise in the vehicle speed according to the increase in the acceleration operation amount. As a result, the automatic transmission 20 can be properly controlled according to the change in the vehicle speed.

As in the third operation, hill ascent control by use of the Q map 88 is carried out if the vehicle 12 further accelerates after the vehicle 12 accelerates according to an acceleration operation amount (operation amount of the throttle grip, throttle opening), and the slope estimator 76 determines that the road surface 92 has an upward slope. Thus, the transmission gear ratio of the automatic transmission 20 can be changed to a proper one according to acceleration operation by the driver 61.

In addition, as in the second operation, hill descent control by use of the Q map 88 is carried out after the slope estimator 76 determines that the road surface 92 has a downward slope and brake operation by the driver 61 is carried out plural times. Thus, the transmission gear ratio of the automatic transmission 20 can be changed to a proper one according to acceleration operation by the driver 61.

Furthermore, as in the second operation, the number of times of operation of the brake 62 by the driver 61 is counted by the counter of the automatic shift mode switching unit 72, and the count by the counter is reset under a condition in which the estimated hill ascent angle θf (θ) is equal to or larger than the Q-map transition determination threshold and the acceleration operation amount is given to the vehicle 12 and the cruise traveling state of the vehicle 12 continues for the time Ta. Due to this, transition to the hill descent control based on the Q map 88 is not made if the downward slope (downhill) is not continuous. Thus, the automatic transmission 20 can be properly controlled according to the slope of the road surface 92 on which the vehicle 12 travels.

Therefore, in the control device 10, a number effects can be achieved by carrying out the first operation to the fourth operation.

Specifically, when the vehicle 12 travels downhill, by rapidly switching the shift map from the D map 86 to the Q map 88, an appropriate engine brake can be ensured and burdensome work of adjusting the speed by brake operation by the driver 61 can be reduced.

On the other hand, in the case of traveling uphill, by rapidly switching the shift map from the D map 86 to the Q map 88 corresponding to increase in the running resistance st, the rear wheel 18 can be rotated with a proper driving force and the traveling performance of the vehicle 12 can be improved.

Furthermore, if the brake detector 54 is in failure, a gear shift schedule that keeps the driver 61 from feeling a sense of discomfort can be realized by preventing erroneous update of the estimated hill ascent angle θf (θ).

In certain embodiments, the vehicle 12 can be various kinds of vehicles such as two-wheeled vehicles, four-wheeled vehicles, hybrid vehicles, and electric vehicles. Furthermore, it is also possible that the drive source of the vehicle 12 includes a motor besides the above-described engine 14. Moreover, the acceleration operation amount refers to the instruction amount of acceleration from the driver 61 to the vehicle 12 and is a concept including the operation amount of the throttle grip, the amount of pressing of an accelerator pedal, the throttle opening, and so forth. In addition, the acceleration operation amount detector detects the acceleration operation amount and can include the throttle grip opening sensor 44, an accelerator pedal sensor, the throttle opening sensor 46, and so forth. Furthermore, the brake detector 54 can include a brake switch, a brake lever, a brake pedal, and so forth with which the driver 61 carries out brake operation. Therefore, the control device 10 is not limited to application to the above-described motorcycle and can be applied as a control device of various kinds of vehicles such as other two-wheeled vehicles, four-wheeled vehicles, hybrid vehicles, and electric vehicles.

Furthermore, in the fourth operation, even when the brake detector 54 is in failure, the intent of the driver 61 to decelerate the vehicle 12, i.e. whether brake operation is present or absent, can be estimated and grasped on the side of the automatic transmission controller 66 from a detection result by the throttle grip opening sensor 44 or the throttle opening sensor 46.

Therefore, by estimating the intent of the driver 61 to decelerate the vehicle 12 by the automatic transmission controller 66 in the fourth operation, the first operation to the third operation, which are premised on input of the brake-on signal from the brake detector 54 to the ECU 26, can be applied. Specifically, in the fourth operation, the input of the brake-on signal in the first operation to the third operation is replaced by processing of sensing the intention of the driver 61 to decelerate the vehicle 12 based on a detection result by the throttle grip opening sensor 44 or the throttle opening sensor 46. This makes it possible to carry out the first operation to the third operation even when the brake detector 54 is in failure and the brake-on signal is not supplied.

Although the present invention is described by using the preferred embodiment above, the technical scope of the present invention is not limited to the scope described in the above embodiment. It is apparent to those skilled in the art that a variety of changes or improvements can be added to the above embodiment. It is apparent from the description of the scope of claims that modes obtained by adding such changes or improvements can also be included in the technical scope of the present invention. Furthermore, parenthesized symbols described in the scope of claims are given after symbols in the accompanying drawings for facilitation of understanding of the present invention and the present invention is not interpreted with limitation by elements given the symbols.

DESCRIPTION OF REFERENCE SYMBOLS

10: Control device
12: Vehicle
14: Engine (drive source)
18: Rear wheel
20: Automatic transmission
24: Throttle valve
26: ECU
44: Throttle grip opening sensor (acceleration operation amount detector)
46: Throttle opening sensor (acceleration operation amount detector)
48: Rotation speed sensor (rotation speed detector)
50: Gear position sensor
52: Vehicle speed sensor (vehicle speed detector)
54: Brake detector
56: Intake air pressure sensor
58: Intake air temperature sensor
60: Water temperature sensor
61: Driver
62: Brake
66: Automatic transmission controller
72: Automatic shift mode switching unit
74: Hill ascent angle update determiner
76: Slope estimator
78: Deceleration determiner
80: Hill ascent angle estimator
82: Automatic shift map
84: Traveling state discrimination map
86: Default-mode shift map
88: Quick-mode shift map (hill ascent shift map, hill descent shift map)
90: Shift-down shift map
92: Road surface
$\sin \theta$: Slope
Ta: Time (predetermined time)
TH: Threshold
TH0: Value
$\theta$, $\theta f$: Estimated hill ascent angle

The invention claimed is:

1. A vehicle comprising:
a drive source configured to transmit power to a drive wheel via an automatic transmission;
a vehicle speed detector configured to detect vehicle speed of the vehicle;
a rotation speed detector configured to detect rotation speed of the drive source;
an acceleration operation amount detector configured to detect an acceleration operation amount of the vehicle;
a slope estimator configured to estimate a slope of a road surface on which the vehicle travels based upon the vehicle speed, the rotation speed, the acceleration operation amount, and a transmission gear ratio of the automatic transmission;
a hill ascent angle estimator configured to estimate a hill ascent angle based upon the slope;
a brake detector configured to detect whether operation of a brake of the vehicle is present or absent; and
a shift controller configured to control the automatic transmission based upon the hill ascent angle estimated by the hill ascent angle estimator and operation of the brake detected by the brake detector;
a control device, comprising
a deceleration determiner configured to determine that the vehicle is in a deceleration state when the acceleration operation amount is equal to or smaller than a threshold, and
a hill ascent angle update determiner configured to prohibit update processing of the hill ascent angle in an increase direction by the hill ascent angle estimator if the slope estimator estimates that the road surface has an upward slope and the deceleration determiner determines that the vehicle is in the deceleration state.

2. The vehicle according to claim 1, wherein
the control device is configured to increase the threshold in association with a rise in the vehicle speed.

3. The vehicle according to claim 1, wherein
the shift controller is configured to carry out hill ascent control to change the transmission gear ratio by using a hill ascent shift map that hastens execution of a shift-down of the automatic transmission compared with in flat road operation based upon the hill ascent angle when the slope estimator determines that the road surface has the upward slope due to acceleration of the vehicle according to the acceleration operation amount, and then the vehicle further accelerates.

4. The vehicle according to claim 3, wherein
the shift controller is configured to carry out hill descent control to change the transmission gear ratio by using a hill descent shift map that hastens execution of a shift-down of the automatic transmission compared with in flat road operation based upon the hill ascent angle when the slope estimator determines that the road surface has a downward slope after operation of the brake is carried out, and then operation of the brake is carried out a predetermined number of times.

5. The vehicle according to claim 4, wherein
the shift controller is configured to count a number of times of operation of the brake, and wherein
the shift controller is configured to reset count of the number of times of operation if the hill ascent angle is equal to or larger than a certain value, and the acceleration operation amount is given to the vehicle, and cruise operation of the vehicle continues for a predetermined time before operation of the brake is carried out the predetermined number of times.

6. A vehicle, comprising:
drive source means for transmitting power to a drive wheel via an automatic transmission;
vehicle speed detector means for detecting vehicle speed;
rotation speed detector means for detecting rotation speed of the drive source means;
acceleration operation amount detector means for detecting an acceleration operation amount of the vehicle;
slope estimator means for estimating a slope of a road surface on which the vehicle travels based upon the vehicle speed, the rotation speed, the acceleration operation amount, and a transmission gear ratio of the automatic transmission;

hill ascent angle estimator means for estimating a hill ascent angle based upon the slope;

brake detector means for detecting whether operation of a brake of the vehicle is present or absent;

shift controller means for controlling the automatic transmission based upon the hill assent angle and operation of the brake;

control means for controlling the vehicle, said control means including deceleration determiner means for determining that the vehicle is in a deceleration state when the acceleration operation amount is equal to or smaller than a threshold, and hill ascent angle update determiner means for prohibiting update processing of the hill ascent angle in an increase direction by the hill ascent angle estimator means if the slope estimator means estimates that the road surface has an upward slope and the deceleration determiner means determines that the vehicle is in the deceleration state.

7. The vehicle according to claim 6, wherein the control means is also for increasing the threshold in association with a rise in the vehicle speed.

8. The vehicle according to claim 6, wherein the shift controller means is for carrying out hill ascent control to change the transmission gear ratio by using a hill ascent shift map that hastens execution of a shift-down of the automatic transmission compared with flat road operation based upon the hill ascent angle when the slope estimator means determines that the road surface has the upward slope due to acceleration of the vehicle according to the acceleration operation amount, and then the vehicle further accelerates.

9. The vehicle according to claim 8, wherein the shift controller means is also for carrying out hill descent control to change the transmission gear ratio by using a hill descent shift map that hastens execution of a shift-down of the automatic transmission compared with flat road operation based upon the hill ascent angle when the slope estimator means determines that the road surface has a downward slope after operation of the brake is carried out, and then operation of the brake is carried out a predetermined number of times.

10. The vehicle according to claim 9, wherein the shift controller means is configured to count a number of times of operation of the brake, and wherein the shift controller means is also for resetting count of the number of times of operation if the hill ascent angle is equal to or larger than a certain value, and the acceleration operation amount is given to the vehicle, and wherein cruise operation of the vehicle continues for a predetermined time before operation of the brake is carried out the predetermined number of times.

* * * * *